(12) United States Patent
Tanaka et al.

(10) Patent No.: US 10,767,612 B2
(45) Date of Patent: Sep. 8, 2020

(54) CONTROL DEVICE FOR COMPRESSION-IGNITION ENGINE

(71) Applicant: Mazda Motor Corporation, Aki-gun, Hiroshima (JP)

(72) Inventors: Daisuke Tanaka, Hiroshima (JP); Yuichiro Tsumura, Aki-gun (JP); Kenko Ujihara, Higashihiroshima (JP); Yuto Matsushima, Hatsukaichi (JP); Masayoshi Higashio, Hiroshima (JP); Hiroki Morimoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 31 days.

(21) Appl. No.: 16/167,877

(22) Filed: Oct. 23, 2018

(65) Prior Publication Data

US 2019/0145367 A1 May 16, 2019

(30) Foreign Application Priority Data

Nov. 10, 2017 (JP) ................................. 2017-217160

(51) Int. Cl.
*F02M 61/14* (2006.01)
*F02D 41/30* (2006.01)
(Continued)

(52) U.S. Cl.
CPC ........... *F02M 61/14* (2013.01); *F02D 19/024* (2013.01); *F02D 35/023* (2013.01);
(Continued)

(58) Field of Classification Search
CPC .. F02M 61/14; F02M 21/0275; F02M 21/023; F02D 41/3076; F02D 35/023;
(Continued)

(56) References Cited

U.S. PATENT DOCUMENTS

| 6,293,246 B1 * | 9/2001 | Tanahashi ................. F01L 1/34 123/305 |
| 2002/0128116 A1 * | 9/2002 | Idogawa ............. F02D 41/3064 477/54 |

FOREIGN PATENT DOCUMENTS

JP 2009108778 A 5/2009

* cited by examiner

*Primary Examiner* — Joseph J Dallo
*Assistant Examiner* — Scott A Reinbold
(74) *Attorney, Agent, or Firm* — Alleman Hall Creasman & Tuttle LLP

(57) ABSTRACT

A control device for a compression-ignition (CI) engine in which partial CI combustion including spark ignition (SI) combustion performed by combusting a portion of mixture gas inside a cylinder by spark ignition followed by CI combustion performed by causing the rest of the mixture gas inside the cylinder to self-ignite is executed within a part of an engine operating range, is provided, including an EGR (exhaust gas recirculation) controller configured to change an EGR ratio, and a combustion controller configured to control the EGR controller during the partial compression-ignition combustion to switch a combustion mode between first and second modes in which the EGR ratio is higher than the first mode. After the first mode is switched to the second mode, if a condition is satisfied, the combustion controller causes the resumption to the first mode after a given period of time has elapsed from the switching.

6 Claims, 20 Drawing Sheets

(51) Int. Cl.
     *F02D 41/00*         (2006.01)
     *F02D 35/02*         (2006.01)
     *F02D 19/02*         (2006.01)
     *F02M 21/02*         (2006.01)
     *F02D 41/40*         (2006.01)
     *F02B 3/06*         (2006.01)
     *F02B 75/12*         (2006.01)
(52) U.S. Cl.
     CPC ....... *F02D 41/006* (2013.01); *F02D 41/0027* (2013.01); *F02D 41/0057* (2013.01); *F02D 41/3041* (2013.01); *F02D 41/3076* (2013.01); *F02M 21/023* (2013.01); *F02M 21/0275* (2013.01); *F02B 3/06* (2013.01); *F02B 2075/125* (2013.01); *F02D 41/402* (2013.01); *F02D 2200/025* (2013.01)
(58) Field of Classification Search
     CPC ............. F02D 41/0057; F02D 41/3041; F02D 41/006; F02D 41/0027; F02D 19/024; F02D 41/402; F02D 2200/025; F02B 2075/125; F02B 3/06
     USPC ........................................................ 123/470
     See application file for complete search history.

CONTROL DEVICE FOR COMPRESSION-IGNITION ENGINE

TECHNICAL FIELD

The present disclosure relates to a control device for a compression-ignition engine, which executes partial compression-ignition combustion in which a mixture gas within a cylinder is partially combusted by spark-ignition (SI combustion) and then the remaining mixture gas within the cylinder is combusted by self-ignition (CI (Compression Ignition) combustion).

BACKGROUND OF THE DISCLOSURE

Recently, HCCI (Homogeneous-Charge Compression Ignition) combustion in which gasoline fuel mixed with air is combusted by self-ignition inside a sufficiently compressed cylinder has attracted attention. The HCCI combustion is a mode in which the mixture gas combusts at a plurality of positions simultaneously, and thus has a higher combustion speed of the mixture gas than in SI combustion (spark-ignition combustion) which is adopted for general gasoline engines. Therefore, the HCCI combustion is said to be significantly advantageous in terms of thermal efficiency. However, the HCCI combustion has issues such as a combustion start timing of the mixture gas (a timing that the mixture gas self-ignites) greatly varying due to an external factor (e.g., atmospheric temperature) and a control during a transient operation in which an engine load sharply changes is difficult.

Therefore, instead of combusting the entire mixture gas by self-ignition, it is proposed to combust a portion of the mixture gas by spark-ignition using a spark plug. That is, after forcibly combusting a portion of the mixture gas through flame propagation caused by spark-ignition (SI combustion), the remaining mixture gas is combusted by self-ignition (CI combustion). Hereinafter, such combustion is referred to as "partial compression-ignition combustion."

For example, JP2009-108778A discloses an engine adopting a similar concept to the partial compression-ignition combustion. This engine causes flame propagation combustion by spark-igniting a stratified mixture gas which is formed around a spark plug by a supplementary fuel injection, and then performs a main fuel injection inside a cylinder warmed up by an effect of the flame propagation combustion, so as to combust through self-ignition the fuel injected in the main fuel injection.

Here, there is a problem that in the engine adopting the partial compression-ignition combustion, combustion noise becomes loud more easily compared to, for example, a general gasoline engine in which only the SI combustion (spark-ignition combustion) is performed. Thus, during the partial compression-ignition combustion, switching to other combustion modes with different in-cylinder gas state function (e.g., EGR (exhaust gas recirculation) ratio or air-fuel ratio) may be requested according to a factor of combustion noise, etc.

However, if such a switching of the combustion mode according to the factor of the combustion noise, etc. is allowed without any restriction, the switching of the combustion mode may be repeated frequently (e.g., immediately after the switching from one mode to the other mode, resuming to the one mode is performed). In this case, a change in noise (sound) accompanying the switching of the mode occurs frequently, thus a person(s) in a cabin may feel discomfort.

SUMMARY OF THE DISCLOSURE

The present disclosure is made in view of the above situations and aims to provide a control device for a compression-ignition engine, which reduces discomfort of a person(s) in a cabin caused by a mode switching at the time of a partial compression-ignition combustion.

In order to solve the issues, according to the one aspect of the present disclosure, a control device for a compression-ignition engine in which partial compression-ignition combustion including spark ignition (SI) combustion performed by combusting a portion of a mixture gas inside a cylinder by spark ignition followed by compression ignition (CI) combustion performed by causing the remaining mixture gas inside the cylinder to self-ignite is executed at least within a part of an operating range of the engine, is provided. The device includes an EGR (exhaust gas recirculation) controller configured to change an EGR ratio that is a ratio of exhaust gas recirculated into the cylinder, and a combustion controller configured to control the EGR controller during the partial compression-ignition combustion to switch a combustion mode between a first mode and a second mode in which the EGR ratio is higher than the first mode. After the combustion mode is switched from the first mode to the second mode, if a condition of resuming to the first mode is satisfied, the combustion controller causes the resumption to the first mode after a given period of time has elapsed from the switching to the second mode.

Note that "causes the resumption to the first mode after a given period of time is elapsed" of course includes a mode to switch to the first mode after the second mode is continued over the given time period, and it is not limited to this, but also includes, for example, a mode to switch to the first mode after undergoing an intermediate state between the first mode and the second mode over the given time period.

According to this configuration, since the resumption to the first mode is not caused unless the given time period elapses even when the condition of resuming to the first mode is satisfied after the switching from the first mode to the second mode, the switching between the first/second modes is efficiently prevented from occurring frequently. Since the EGR ratio (a ratio of inactive exhaust gas recirculated into the cylinder) differs between the first mode and the second mode, it is considered that a waveform of heat generation (or pressure increase) at the combustion is different and the sound of the occurred noise is also different. Thus, if the switching between the first/second modes is repeated frequently, such a change in noise (sound) occurs frequently, which may cause the person(s) in a cabin to feel discomfort. In this regard, according to this configuration, the switching between the first/second modes is not repeated frequently, and the change in noise (sound) accompanying the mode switching is effectively prevented from occurring frequently so as to reduce the discomfort of a person(s) in a cabin.

When the second mode is selected, the combustion controller may control an air-fuel ratio that is a ratio of air to fuel inside the cylinder to be more reduced than when the first mode is selected.

According to this configuration, as the combustion mode is switched from the first mode to the second mode, the ratio of the exhaust gas (the EGR gas) inside the cylinder increases accordingly while the ratio of air (fresh air) is reduced. Therefore, the total gas amount inside the cylinder does not differ greatly between the first/second modes, and a large change in torque due to a difference in pumping loss, etc. (a difference in output torque before and after the switching) is effectively avoided at the time of switching between the first/second modes.

After the partial compression-ignition combustion in the first mode is started and if a condition of switching from the first mode to the second mode is satisfied, the combustion controller may cause the resumption to the second mode, immediately after the condition is satisfied or after a shorter period of time has elapsed from the start of the first mode than the given period.

Since the EGR ratio is higher in the second mode compared to the first mode (i.e., the ratio of inactive gas inside the cylinder is high), the combustion noise is easier to be reduced. Therefore, according to this configuration of switching to the second mode in an early stage after the condition of switching from the first mode to the second mode is satisfied, the first mode in which the noise relatively easily becomes large is not continued unnecessarily and the combustion noise is effectively reduced by the prompt switch to the second mode.

A target value of a given control amount including a timing of the spark ignition may be determined in advance so that a combustion center of gravity of the partial compression-ignition combustion in the first mode and a combustion center of gravity of the partial compression-ignition combustion in the second mode are located at the same position when an engine speed and an engine load are the same in the first mode and the second mode.

According to this configuration, since the combustion center of gravity does not largely deviate even when the combustion mode is switched between the first mode and the second mode, a change in torque when switching the mode is reduced, and a smooth mode switching which is not easily perceived by a passenger is achieved.

During the partial compression-ignition combustion in the first and second modes, the combustion controller may correct the control amount with respect to the target value based on a noise index value representing noise accompanying the combustion, and when the noise index value is confirmed to exceed a given threshold while the first mode is selected, switch the combustion mode from the first mode to the second mode.

According to this configuration, since the control amount is corrected based on the noise index value, the noise during the SPCCI combustion in each of the first/second modes is maintained at a low level. However, even in this case, for example, immediately after shifting from the second mode with the high EGR ratio to the first mode with the low EGR ratio, the correction of the control amount cannot catch up and there is a possibility that loud noise may temporarily occur. According to this configuration, since the combustion mode is returned to the second mode and the EGR ratio is reduced in such a case, it is effectively avoided that loud noise caused by the mode switching continuously occurs.

In order to solve the issue, according to another aspect of the present disclosure, a control device for a compression-ignition engine in which partial compression-ignition combustion including SI combustion performed by combusting a portion of the mixture gas inside a cylinder followed by CI combustion performed by causing the remaining mixture gas inside the cylinder to self-ignite is executed at least within a part of an operating range of the engine, is provided. The device includes an air-fuel ratio controller configured to change an air-fuel ratio that is a ratio of air inside the cylinder to fuel, and a combustion controller configured to control the air-fuel ratio controller during the partial compression-ignition combustion to switch a combustion mode between a first mode and a second mode in which the air-fuel ratio is lower than the first mode. After the combustion mode is switched from the first mode to the second mode, if a condition of resuming to the first mode is satisfied, the combustion controller causes the resumption to the first mode after a given period of time has elapsed from the switching to the second mode.

According to this configuration, since the switching between the first/second modes in which the air-fuel ratio differs therebetween is not repeated frequently, the change in noise (sound) accompanying the mode switching is effectively avoided from occurring frequently so as to reduce the discomfort of a person(s) in a cabin.

BRIEF DESCRIPTION OF THE DRAWINGS

FIGS. 5A to 5C are operation maps illustrating a difference in control according to a progression of a warm-up of the engine and an engine speed and an engine load, in which FIG. 5A is a first operation map used in a warmed-up state, FIG. 5B is a second operation map used in a partially warmed-up state, and FIG. 5C is a third operation map used in a cold state.

DETAILED DESCRIPTION OF THE DISCLOSURE (1) Overall Configuration of Engine

Figure 1:
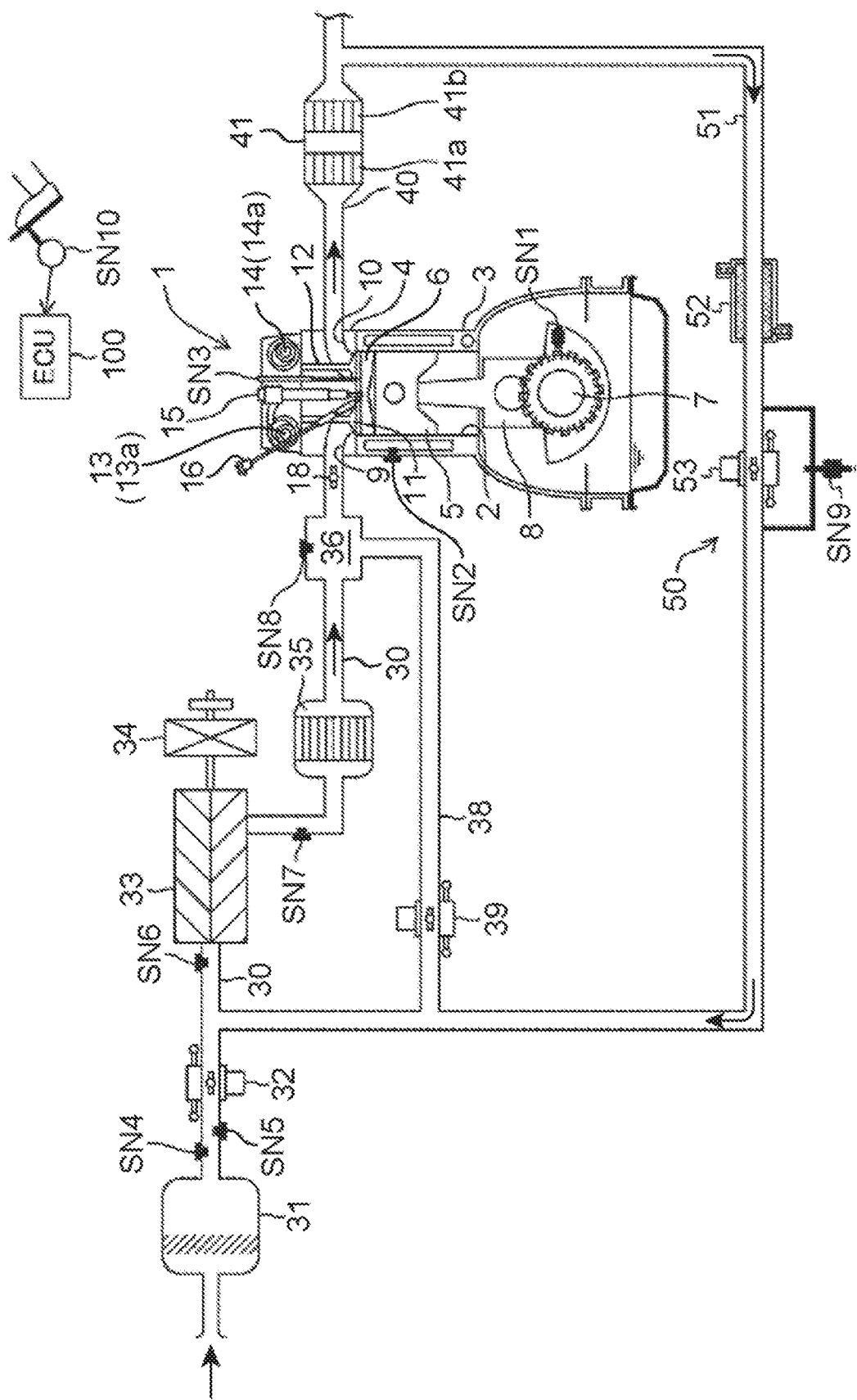
FIG. 1 is a system diagram schematically illustrating an overall configuration of a compression-ignition engine according to one embodiment of the present disclosure.
Figure 2:
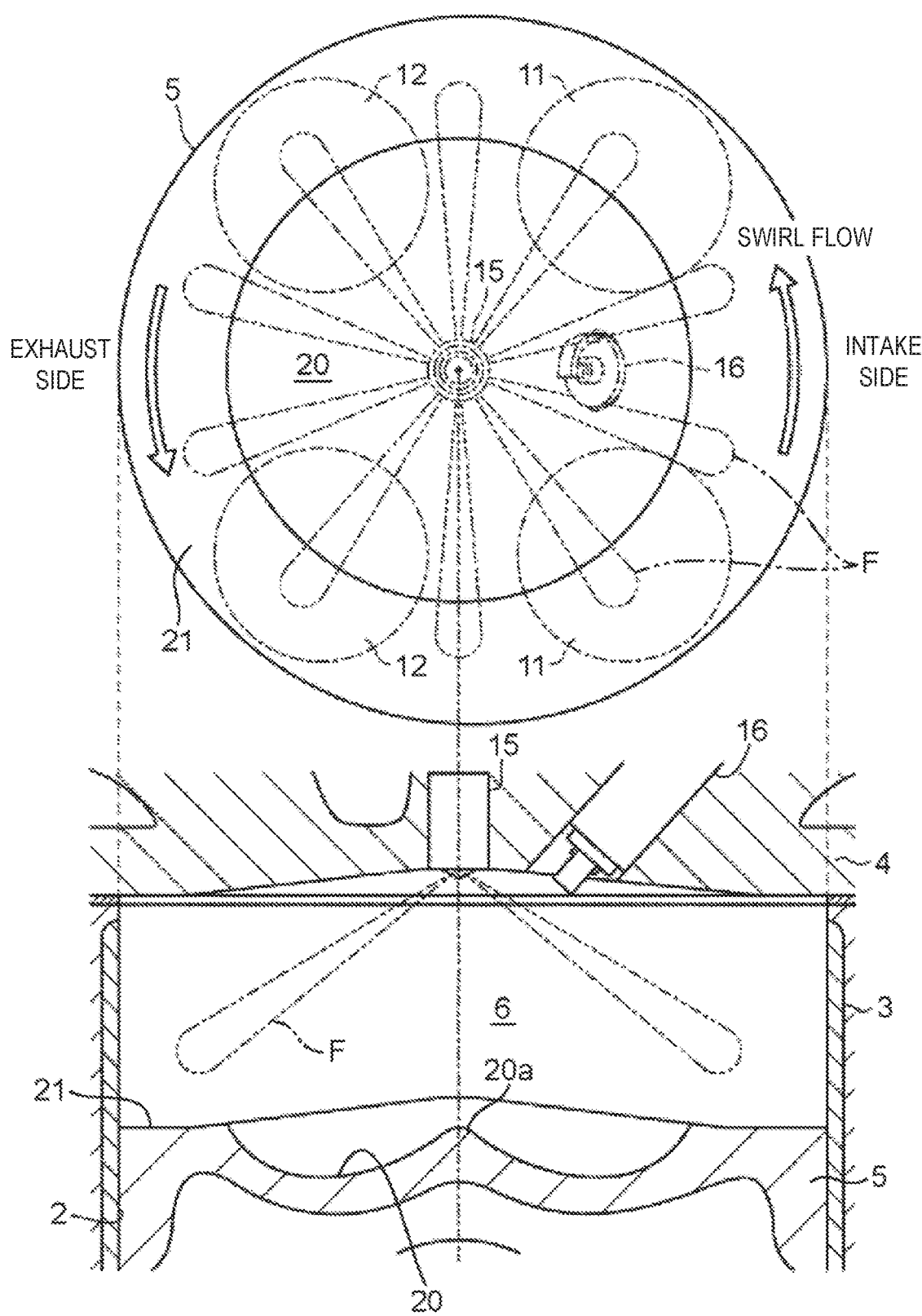
FIG. 2 shows diagrams illustrating a cross-sectional view of an engine body and a plan view of a piston.

FIGS. 1 and 2 are diagrams illustrating a suitable embodiment of a compression-ignition engine (hereinafter, simply referred to as "the engine") to which a control device of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an exhaust gas recirculation (EGR) device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5 and thus it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1 as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and a rotational speed of the crankshaft 7 (engine speed), and a water temperature sensor SN2 which detects a temperature of a coolant flowing through inside the cylinder block 3 and the cylinder head 4 (engine water temperature).

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. A total of two intake valves 11 are provided so as to open and close the first and second intake ports 9A and 9B, respectively, and a total of two exhaust valves 12 are provided so as to open and close the first and second exhaust ports 10A and 10B, respectively.

Figure 3:
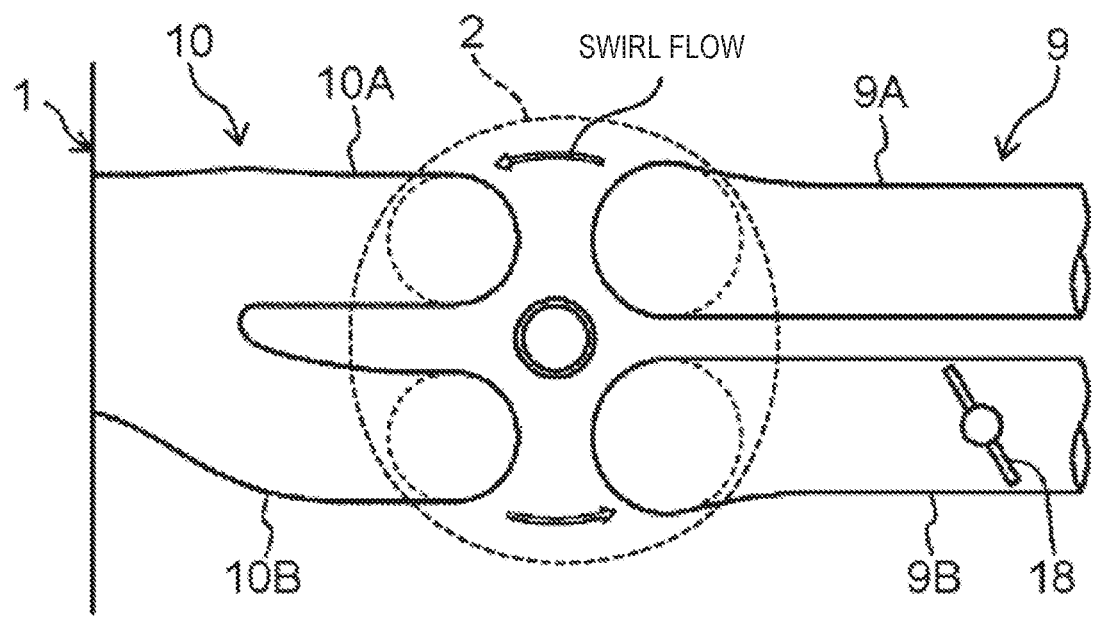
FIG. 3 is a schematic plan view illustrating a structure of a cylinder and intake and exhaust systems in the vicinity thereof.

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A increases, a circling flow circling around an axial line of the cylinder (i.e., swirl flow) is enhanced. Conversely, driving the swirl valve 18 in the opening direction weakens the swirl flow. Note that the intake port 9 of this embodiment is a tumble port formable of a tumble flow. Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a changeable of at least an open timing of the intake valve 11. Similarly, the valve operating mechanism 14 for the exhaust valve 12 is built therein with an exhaust VVT 14a changeable of at least a close timing of the exhaust valve 12. By controlling the intake VVT 13a and the exhaust VVT 14a, in this embodiment, a valve overlap period in which both the intake and exhaust valves 11 and 12 are opened over TDC of exhaust stroke is adjusted, and by adjusting the valve overlap period, an amount of burned gas remaining in the combustion chamber 6 (internal EGR gas) is adjusted. Note that the intake VVT 13a (exhaust VVT 14a) may be a variable mechanism which changes only the open timing (close timing) while fixing the close timing (open timing) of the intake valve 11 (exhaust valve 12), or a phase-variable mechanism which simultaneously changes the open timing and the close timing of the intake valve 11 (exhaust valve 12). The intake and exhaust VVTs 13a and 14a correspond to one example of an "EGR controller" and an "air-fuel ratio controller."

The cylinder head 4 is provided with the injector 15 which injects the fuel (mainly gasoline) into the combustion chamber 6, and a spark plug 16 which ignites the mixture gas containing the fuel injected into the combustion chamber 6 from the injector 15 and air introduced into the combustion chamber 6. The cylinder head 4 is further provided with an in-cylinder pressure sensor SN3 which detects pressure of the combustion chamber 6 (hereinafter, also referred to as "in-cylinder pressure"). Note that the in-cylinder pressure sensor SN3 corresponds to a "detector."

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is a multi-port injector having a plurality of nozzle ports at its tip portion, and the fuel is injected radially from the plurality of nozzle ports ("F" in FIG. 2 indicates fuel spray injected from the respective nozzle ports). The injector 15 is provided so that its tip portion opposes to the center portion (bulge portion 20a) of the crown surface of the piston 5.

The spark plug 16 is disposed at a somewhat offset position to the intake side with respect to the injector 15. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake port 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in order from the upstream side.

An airflow sensor SN4 which detects the flow rate of intake air, first and second intake air temperature sensors SN5 and SN7 which detect a temperature of the intake air, and first and second intake air pressure sensors SN6 and SN8 which detect the pressure of the intake air are provided in various parts of the intake passage 30. The airflow sensor SN4 and the first intake air temperature sensor SN5 are provided in a portion of the intake passage 30 between the air cleaner 31 and the throttle valve 32, and detect the flow rate and the temperature of the intake air passing through this portion. The first intake air pressure sensor SN6 is provided in a portion of the intake passage 30 between the throttle valve 32 and the booster 33 (downstream of a connection port of an EGR passage 51 described later), and detects the pressure of the intake air passing through this portion. The second intake air temperature sensor SN7 is provided in a portion of the intake passage 30 between the booster 33 and the intercooler 35, and detects the temperature of intake air passing through this portion. The second intake air pressure sensor SN8 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. Burned gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components (HC, CO and $NO_x$) contained within the exhaust gas flowing through the exhaust passage 40, and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

The EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts a flow rate of the exhaust gas flowing through the EGR passage 51. The EGR valve 53 corresponds to one example of an "EGR controller" and an "air-fuel ratio controller."

A pressure difference sensor SN9 which detects a difference between pressure upstream of the EGR valve 53 and pressure downstream thereof is provided in the EGR passage 51.

(2) Control System

Figure 4:
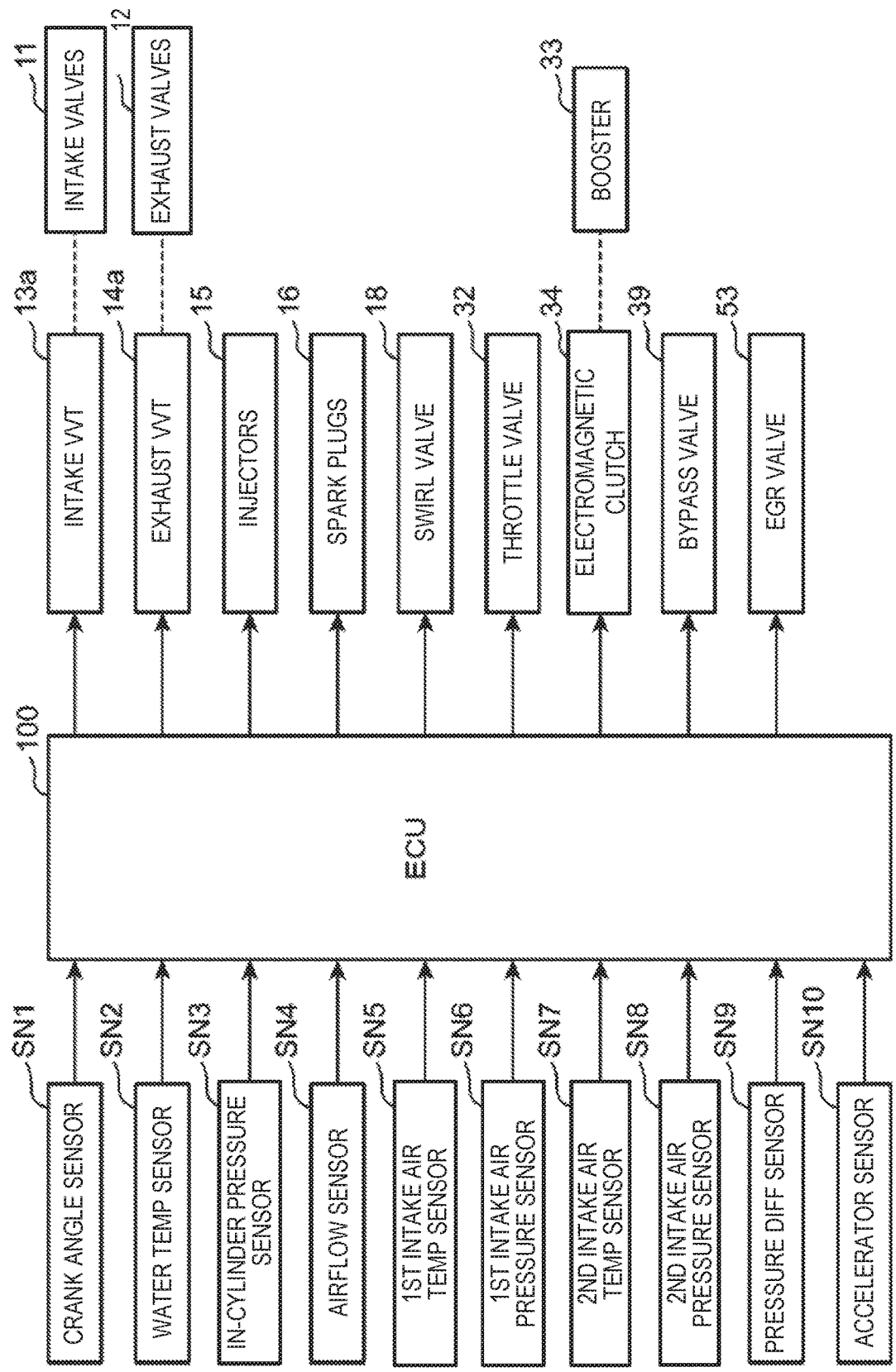
FIG. 4 is a block diagram illustrating a control system of the engine.

FIG. 4 is a block diagram illustrating a control system of the engine. An ECU (electronic control unit) 100 illustrated in FIG. 4 is a microprocessor which comprehensively controls the engine, and comprised of a well-known processor, ROM, RAM, etc.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, the first and second intake air temperature sensors SN5 and SN7, the first and second intake air pressure sensors SN6 and SN8, and the pressure difference sensor SN9, which are described above. The ECU 100 sequentially receives the information detected by these sensors (i.e., the crank angle, the engine speed, the engine water temperature, the in-cylinder pressure, the intake air flow rate, the intake air temperatures, the intake air pressures, the difference in pressure between the upstream and downstream sides of the EGR valve 53, etc.).

Further, an accelerator sensor SN10 which detects an opening of an accelerator pedal controlled by a vehicle driver driving the vehicle is provided in the vehicle, and a detection signal from the accelerator sensor SN10 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results.

Note that the ECU 100 as described above corresponds to a "combustion controller."

(3) Control According to Operating State

Figure 5A:
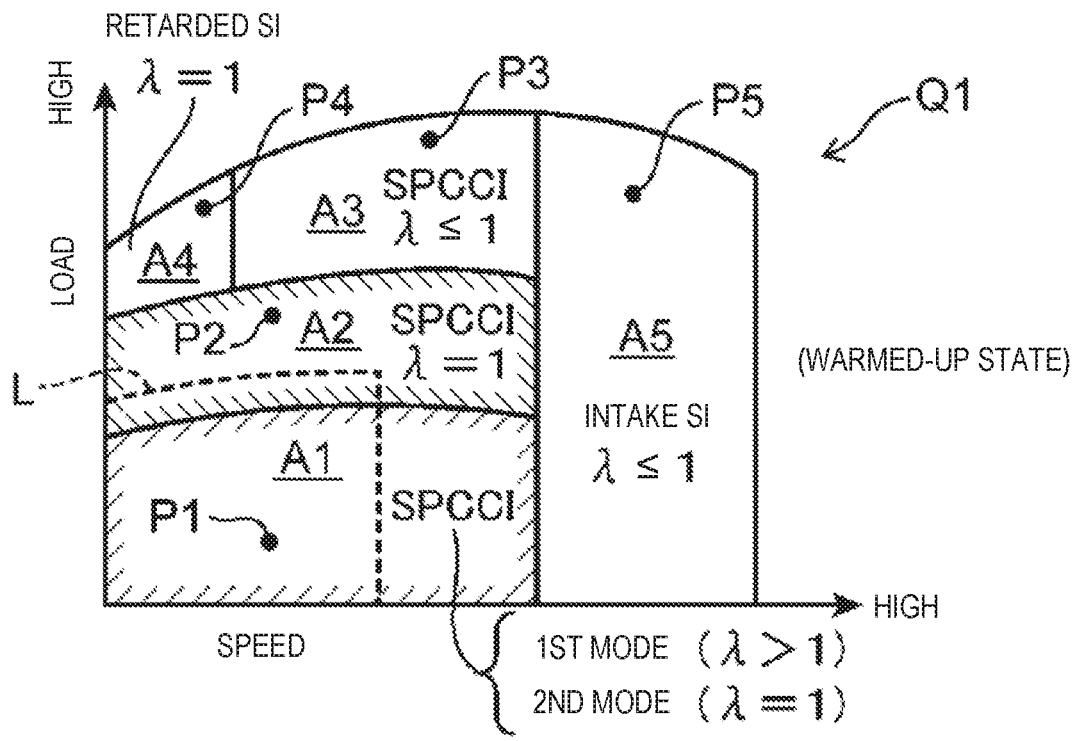
Figure 5B:
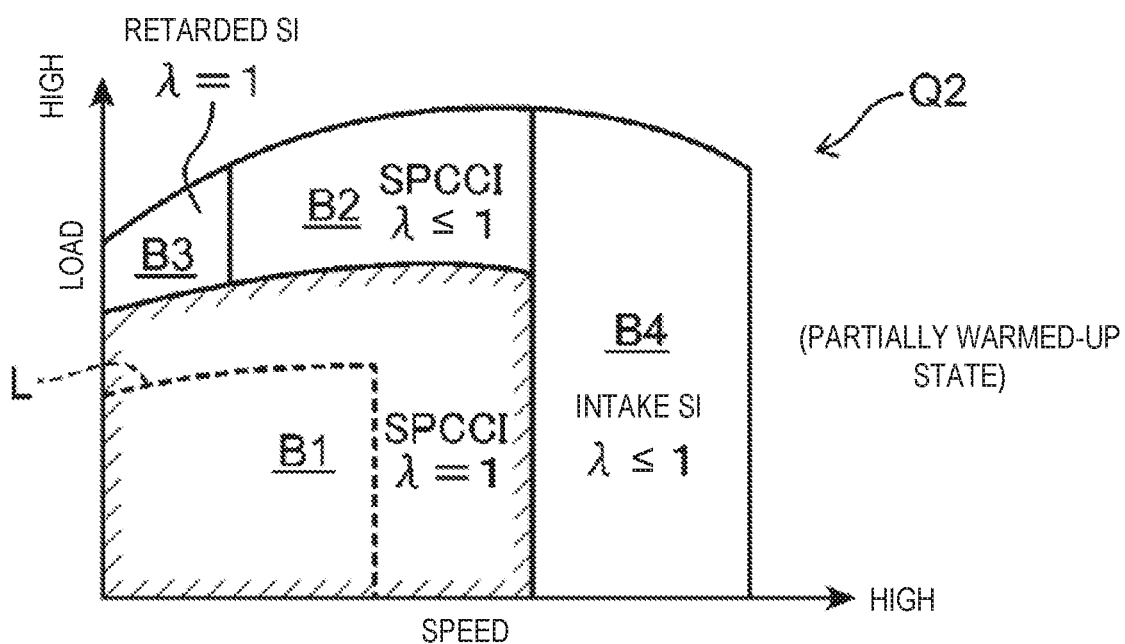
Figure 5C:
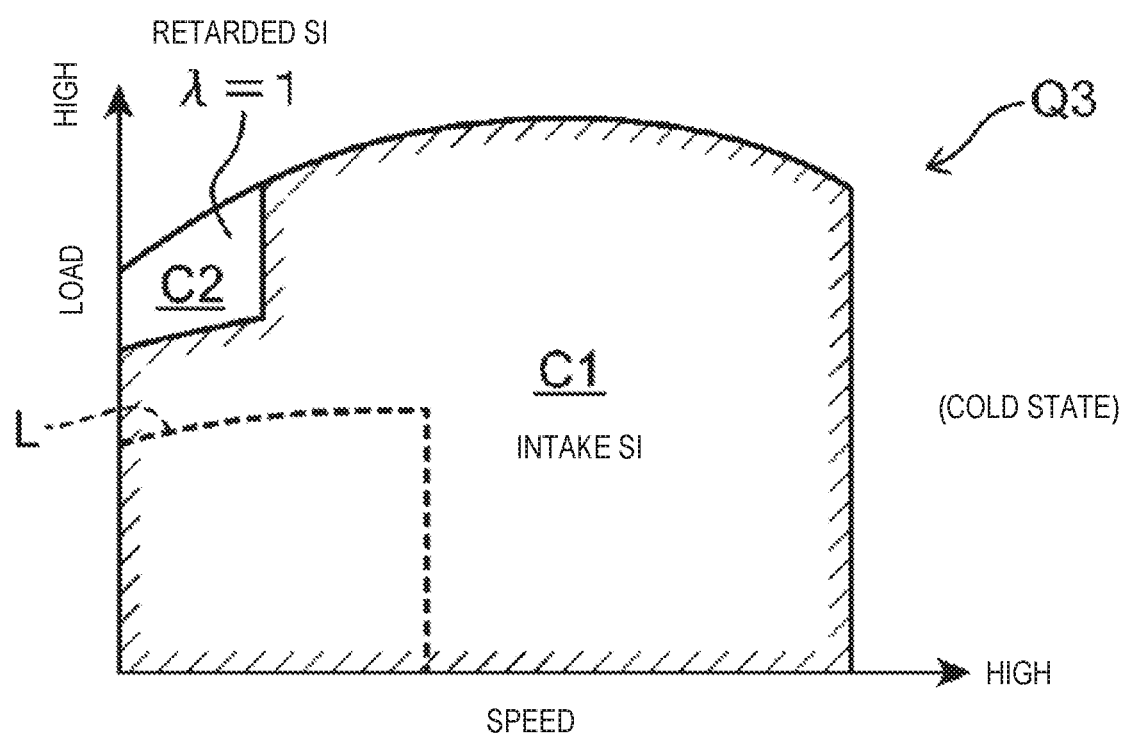

FIGS. 5A to 5C are operation maps illustrating a difference in control according to a progression of a warm-up of the engine and the engine speed and load. As illustrated in FIGS. 5A to 5C, in this embodiment, different operation maps Q1 to Q3 are prepared corresponding to three stages including a warmed-up state where the warm-up of the engine is completed, a partially warmed-up state where the engine is in process of warming up, and a cold state where the engine is not warmed up. Hereinafter, the operation map Q1 used in the warmed-up state is referred to as the first operation map, the operation map Q2 used in the partially warmed-up state is referred to as the second operation map, and the operation map Q3 used in the cold state is referred to as the third operation map.

The first operation map Q1 for the warmed-up state (FIG. 5A) includes five operating ranges A1 to A5 in which the combustion mode is different, the second operation map Q2 for the partially warmed-up state (FIG. 5B) includes four operating ranges B1 to B4 in which the combustion mode is different, and the third operation map Q3 for the cold state (FIG. 5C) includes two operating ranges C1 and C2 in which the combustion mode is different. The details of the combustion mode in each of these operating ranges will be described later.

Figure 6:
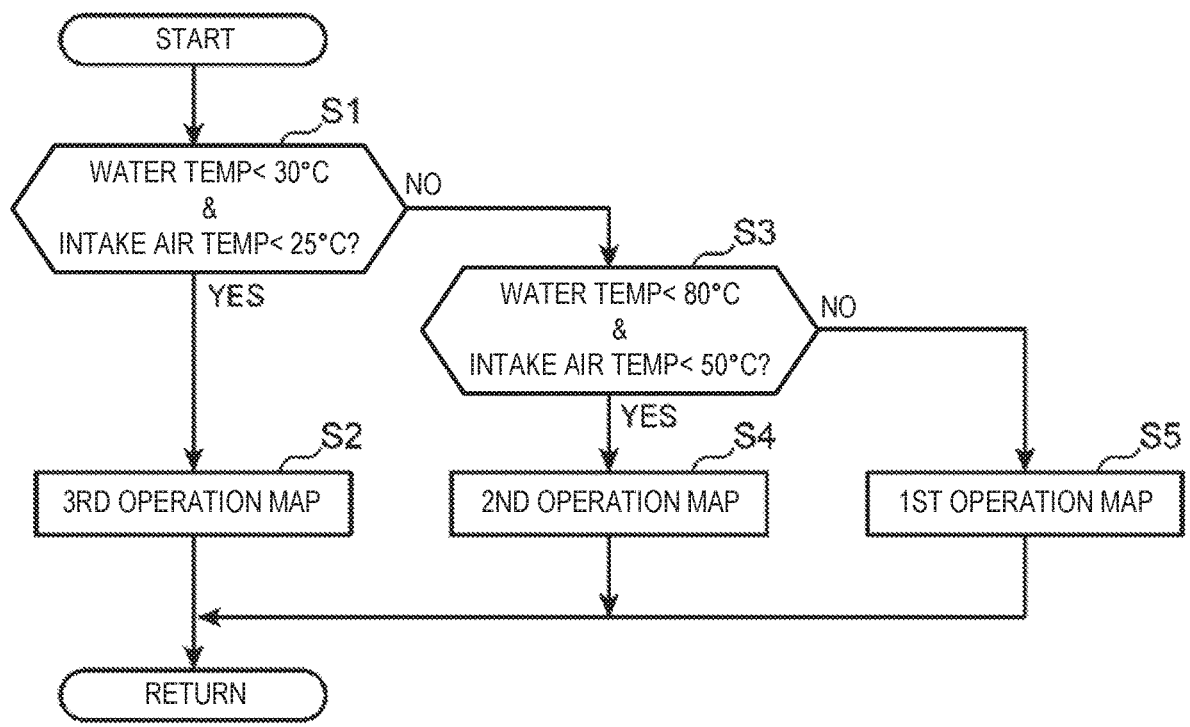
FIG. 6 is a flowchart illustrating a procedure for selecting a suitable map from the first to third operation maps.

FIG. 6 is a flowchart illustrating a procedure for selecting a suitable map from the first to third operation maps Q1 to Q3. Once the control illustrated in this flowchart is started, at S1, the ECU 100 determines whether (i) the engine water temperature is below 30° C. and (ii) the intake air temperature is below 25° C. are both satisfied, based on the engine water temperature detected by the water temperature sensor SN2 and the intake air temperature detected by the second intake air temperature sensor SN7.

If S1 is YES and it is confirmed that (i) and (ii) are satisfied, i.e., both "engine water temperature<30° C." and "intake air temperature<25° C." are satisfied and the engine is in the cold state, the ECU 100 shifts to S2 to determine the third operation map Q3 illustrated in FIG. 5C as the operation map to be used.

On the other hand, if S1 is NO and it is confirmed that at least one of (i) and (ii) is not satisfied, the ECU 100 shifts to S3 to determine whether (iii) the engine water temperature is below 80° C. and (iv) the intake air temperature is below 50° C. are both satisfied, based on the engine water temperature detected by the water temperature sensor SN2 and the intake air temperature detected by the second intake air temperature sensor SN7.

If S3 is YES and it is confirmed that (iii) and (iv) are satisfied, i.e., at least one of "engine water temperature≥30° C." and "intake air temperature≥25° C." is satisfied, and both "engine water temperature<80° C." and "intake air temperature<50° C." are satisfied, which means that the engine is in the partially warmed-up state, the ECU 100 shifts to S4 to determine the second operation map Q2 illustrated in FIG. 5B as the operation map to be used.

If S3 is NO and it is confirmed that at least one of (iii) and (iv) is not satisfied, i.e., at least one of "engine water temperature≥80° C." and "intake air temperature≥50° C." is satisfied, which means that the engine is in the warmed-up state (warm-up completed state), the ECU 100 shifts to S5 to determine the first operation map Q1 illustrated in FIG. 5A as the operation map to be used.

Next, details of controls (a difference in combustion control according to the engine speed/load) defined by the operation maps Q1 to Q3 in the cold state, the partially warmed-up state, and the warmed-up state are described, respectively.

(A) Control in Warmed-Up State

First, a combustion control in the warmed-up state of the engine is described with reference to the first operation map Q1 (FIG. 5A). When the five operating ranges included in the first operation map Q1 are a first range A1, a second range A2, a third range A3, a fourth range A4 and a fifth range A5, the first range A1 is a low-/medium-speed and low-load range in which the engine load is low (including zero load) and the engine speed is low or medium, the second range A2 is a low-/medium-speed and medium-load range in which the engine load is higher than the first range A1, the fourth range A4 is a low-speed and high-load range in which the engine load is higher than the second range A2 and the engine speed is low, the third range A3 is a medium-speed and high-load range in which the engine speed is higher than the fourth range A4, and the fifth range A5 is a high-speed range in which the engine speed is higher than the first to fourth ranges A1 to A4. Hereinafter, the combustion mode, etc. selected in each operating range will be sequentially described.

(a-1) First Range

Within the first range A1 in which the engine speed is low or medium and the engine load is low, the partial compression-ignition combustion combining the SI combustion and the CI combustion (hereinafter referred to as "SPCCI combustion") is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the rest of the mixture gas in the combustion chamber 6 by self-ignition (by the further increase in temperature and pressure accompanying the SI combustion). Note that "SPCCI" is an abbreviation of "SPark Controlled Compression Ignition."

Figure 7:
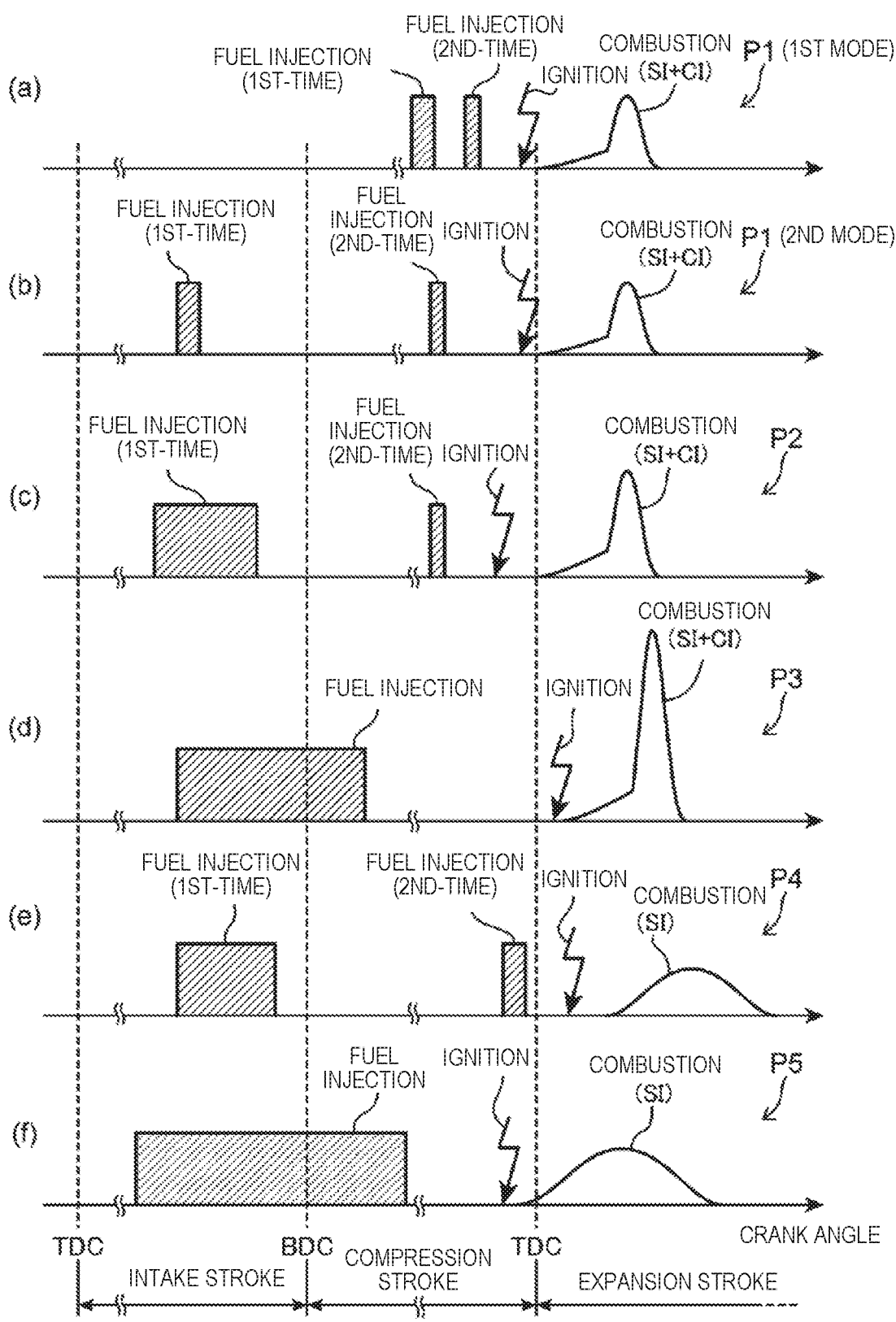
FIG. 7 shows time charts schematically illustrating a combustion control executed in respective ranges of the first operation map.
Figure 8:
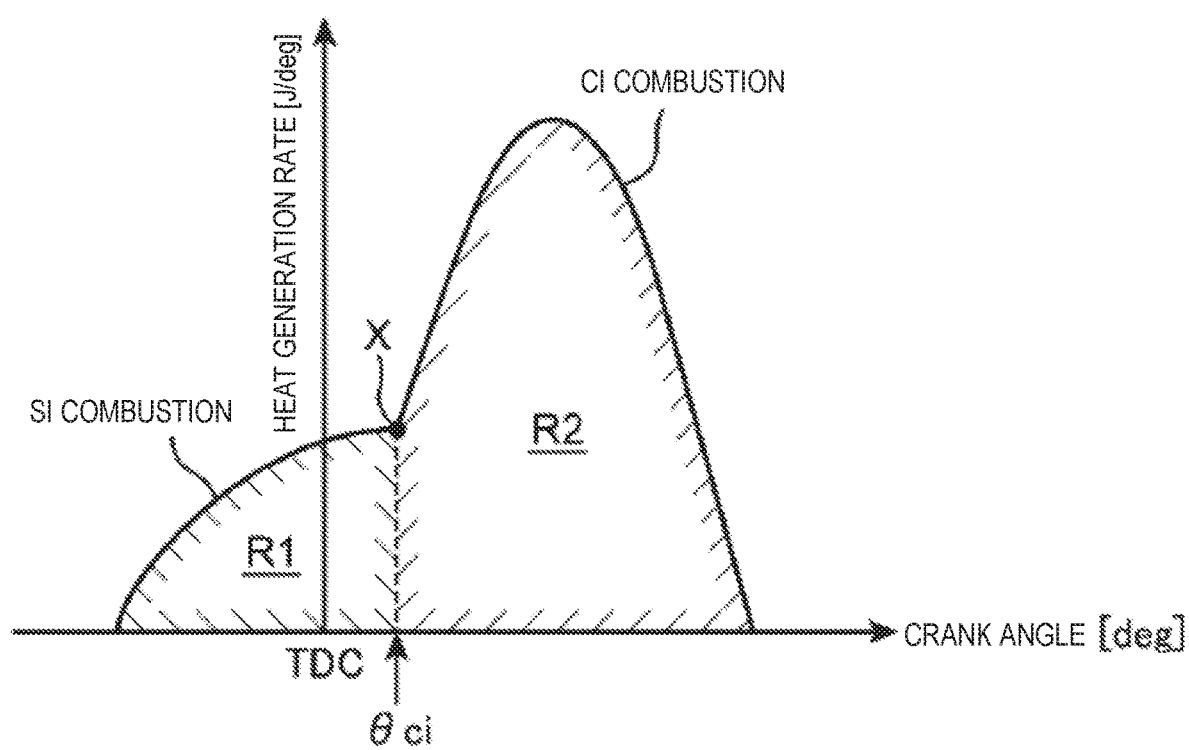
FIG. 8 is a chart illustrating a waveform of a heat generation rate in SPCCI combustion (partial compression-ignition combustion).

The SPCCI combustion has a characteristic that the heat generation in the CI combustion is faster than that in the SI combustion. For example, as illustrated in FIG. 7 or 8 described later, a waveform of a heat generation rate caused by the SPCCI combustion has a shape in which a rising slope in an early stage of the combustion which corresponds to the SI combustion is gentler than a rising slope caused corresponding to the CI combustion occurring subsequently. In other words, the waveform of the heat generation rate caused by the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order. Further, corresponding to the tendency of such a heat generation rate, in the SPCCI combustion, a pressure increase rate (dp/dθ) inside the combustion chamber 6 caused by the SI combustion is lower than that in the CI combustion.

When the temperature and pressure inside the combustion chamber 6 rise due to the SI combustion, the unburned mixture gas self-ignites and the CI combustion starts. As illustrated in FIG. 7 or 8 described later, the slope of the waveform of the heat generation rate changes from gentle to sharp at the timing of self-ignition (that is, the timing when the CI combustion starts). That is, the waveform of the heat generation rate caused by the SPCCI combustion has a flection point at a timing when the CI combustion starts (labeled with an "X" in FIG. 8).

After the CI combustion starts, the SI combustion and the CI combustion are performed in parallel. In the CI combustion, since the combustion speed of the mixture gas is higher than that in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the piston 5 descending, the rise of the heat generation rate is prevented, which avoids excessive dp/dθ in the CI combustion. In the SPCCI combustion, due to the CI combustion being performed after the SI combustion as described above, it is unlikely for dp/dθ which is an index of combustion noise to become excessive, and the combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves the fuel efficiency compared to the SI combustion alone.

Within the first range A1, two kinds of modes, a first mode and a second mode, are prepared as specific modes of the SPCCI combustion. The first mode is a mode in which the SPCCI combustion is performed while setting an air-fuel ratio (A/F) which is a mass ratio between air (fresh air) inside the combustion chamber 6 and the fuel larger than the stoichiometric air-fuel ratio (14.7:1), and the second mode is a mode in which the SPCCI combustion is performed while setting the air-fuel ratio to or near the stoichiometric air-fuel ratio. In other words, in the first mode, the SPCCI combustion is performed in a lean air-fuel ratio environment in which an excess air ratio $\lambda$ (a value obtained by dividing an actual air-fuel ratio by the stoichiometric air-fuel ratio) is higher than 1, and in the second mode, the SPCCI combustion is performed in a stoichiometric environment in which the excess air ratio $\lambda$ is at or near 1. For example, the excess air ratio $\lambda$ is set to 2 or higher in the first mode, and the excess air ratio $\lambda$ is set to 1±0.2 in the second mode. Within the first range A1, the first mode ($\lambda$>1) is basically selected, and when loud combustion noise is detected while operating in the first mode, the combustion mode is temporarily switched to the second mode ($\lambda$=1). Note that the details of the mode switch due to combustion noise will be described later.

In order to achieve the SPCCI combustion in the first/second mode as described above, within the first range A1, the various components of the engine are controlled by the ECU 100 as follows.

The injector 15 performs the fuel injection in a different form depending on which the selected mode is, the first or second mode. Specifically, when the first mode is selected, the injector 15 injects all or majority of the fuel for one combustion cycle, during the compression stroke. For example, when the engine is operated at an operation point P1 within the first range A1 and the first mode is selected, the injector 15 injects the fuel separately in two times from an intermediate stage to a final stage of the compression stroke, as illustrated in the chart (a) of FIG. 7. On the other hand, when the second mode is selected, the injector 15 advances the injection timing of at least a portion of the fuel to intake stroke. For example, when the engine is operated at the operation point P1 and the second mode is selected, as illustrated in the chart (b) of FIG. 7, the injector 15 performs the first fuel injection on the intake stroke and the second fuel injection on the compression stroke.

The spark plug 16 ignites the mixture gas near CTDC. For example, at the operation point P1, the spark plug 16 ignites the mixture gas at a slightly advanced timing from CTDC. This ignition triggers the SPCCI combustion, a portion of the mixture gas in the combustion chamber 6 is combusted through flame propagation (SI combustion), and then the rest of the mixture gas is combusted by self-ignition (CI combustion).

The booster 33 is controlled to be OFF within a boost line L illustrated in the first operation map Q1 (FIG. 5A), and be ON outside the boost line L. Inside the boost line L where the booster 33 is OFF, i.e., at the low engine speed side of the first range A1, the electromagnetic clutch 34 is disengaged to disconnect the booster 33 from the engine body 1 and the bypass valve 39 is fully opened so as to stop boosting by the booster 33. Outside the boost line L where the booster 33 is ON, i.e., at the high engine speed side of the first range A1, the electromagnetic clutch 34 is engaged to connect the booster 33 to the engine body 1 so as to perform boosting by the booster 33. Here, an opening of the bypass valve 39 is controlled so that the pressure in the surge tank 36 (boosting pressure) detected by the second intake air pressure sensor SN8 matches a given target pressure determined for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

The intake VVT 13a and the exhaust VVT 14a set valve operation timings of the intake and exhaust valves 11 and 12 so that internal EGR is performed, i.e., the valve overlap period in which both the intake and exhaust valves 11 and 12 are opened over TDC of the exhaust stroke is sufficiently formed. As a result, the internal EGR which leaves the burned gas inside the combustion chamber 6 is achieved, and the temperature of the combustion chamber 6 (the initial temperature before the compression) is increased. The introduction amount of the internal EGR gas is set smaller in the first mode ($\lambda$>1) than in the second mode ($\lambda$=1).

The throttle valve 32 is fully opened.

An opening of the EGR valve 53 is controlled so that the air-fuel ratio inside the combustion chamber 6 becomes a target air-fuel ratio ($\lambda$>1 or $\lambda$=1) defined for the respective first and second modes. In other words, the EGR valve 53 adjusts the flow rate inside the EGR passage 51 so as to recirculate from the EGR passage 51 to the combustion chamber 6, an amount of gas obtained by subtracting the air amount corresponding to the target air-fuel ratio and the amount of burned gas left in the combustion chamber 6 due to the internal EGR from an entire gas amount introduced into the combustion chamber 6 when the throttle valve 32 is fully opened, as external EGR gas. In the first mode ($\lambda$>1), since the amount of air required inside the combustion chamber 6 is larger compared to that in the second mode ($\lambda$=1), the introduction amount of the external EGR gas is smaller than that in the second mode. Note that within the first range A1, the air-fuel ratio (A/F) is set to or leaner than the stoichiometric air-fuel ratio as described above, and also the EGR gas (external EGR gas and internal EGR gas) is introduced into the combustion chamber 6. Therefore, a gas-fuel ratio (G/F) which is a mass ratio of the entire gas to the fuel inside the combustion chamber 6 is lean in both the first and second modes.

An opening of the swirl valve 18 is in the fully closed state or narrowed to a small opening close to the fully closed state. As a result, all or majority of the intake air introduced into the combustion chamber 6 is from the first intake port 9A (the intake port on the side where the swirl valve 18 is not provided), thus a strong swirl flow is formed inside the combustion chamber 6. This swirl flow grows during the intake stroke and remains until the middle of the compression stroke. Therefore, for example, when the fuel is injected after an intermediate stage of the compression stroke as during the operation in the first mode illustrated in (a) of FIG. 7 (in the mode in which the SPCCI combustion is performed in the lean air-fuel ratio environment in which $\lambda$>1), stratification of the fuel is achieved by the effect of the swirl flow. That is, when the fuel is injected after the intermediate stage of the compression stroke in the presence of the swirl flow, the injected fuel is collected in a center portion of the combustion chamber 6 where the swirl flow is relatively weak. Thus, such concentration difference that the fuel in the center portion of the combustion chamber 6 concentrates more than outside thereof (outer circumferential portion) occurs, and the stratification of the fuel is achieved. For example, when operating in the first mode, the air-fuel ratio in the center portion of the combustion chamber 6 is set to between 20:1 and 30:1 and the air-fuel ratio in an outer circumference portion of the combustion chamber 6 is set to 35:1 or above.

(a-2) Second Range

Within the second range A2 in which the engine speed is low or medium and the engine load is medium, the control for performing the SPCCI combustion of the mixture gas is executed in the environment in which the air-fuel ratio inside the combustion chamber 6 is substantially the stoichiometric air-fuel ratio ($\lambda$=1). For example, in order to achieve the SPCCI combustion in such a stoichiometric environment, within the second range A2, various components of the engine are controlled by the ECU 100 as follows.

The injector 15 injects a portion of the fuel to be injected in one combustion cycle during the intake stroke, and injects the rest of the fuel on the compression stroke. For example, as illustrated in the chart (c) of FIG. 7, at an operation point P2 within the second operating range A2, the injector 15 performs a first (first-time) fuel injection by which a relatively large amount of fuel is injected during the intake stroke and performs a second (second-time) fuel injection by which a smaller amount of fuel than the first fuel injection is injected during the compression stroke.

The spark plug 16 ignites the mixture gas near CTDC. For example, at the operation point P2, the spark plug 16 ignites the mixture gas at a slightly advanced timing from CTDC. This ignition triggers the SPCCI combustion, a portion of the mixture gas inside the combustion chamber 6 is combusted through flame propagation (SI combustion), and then the rest of the mixture gas is combusted by self-ignition (CI combustion).

The booster 33 is controlled to be OFF in a section of the low-load and low-speed range overlapping with the section within the boost line L, and be ON outside this section. When the booster 33 is ON and boosting the intake air, the opening of the bypass valve 39 is controlled so that the pressure inside the surge tank 36 (boosting pressure) matches with the target pressure.

The intake VVT 13a and the exhaust VVT 14a set valve operation timings of the intake and exhaust valves 11 and 12 so that the internal EGR is performable (i.e., so that a given length of valve overlap period is formed). Note that the internal EGR may substantially be stopped on the higher load side within the second range A2.

The throttle valve 32 is fully opened.

The opening of the EGR valve 53 is controlled so that the air-fuel ratio (A/F) in the combustion chamber 6 becomes the stoichiometric air-fuel ratio ($\lambda$=1) or thereabout. For example, the EGR valve 53 adjusts the amount of the external gas recirculated through the EGR passage 51 (external EGR gas) so that the excess air ratio $\lambda$ becomes 1±0.2. Note that the gas-fuel ratio (G/F) inside the combustion chamber 6 is set lean.

The opening of the swirl valve 18 is in the fully closed state or narrowed to a small opening close to the fully closed state. Thus, a strong swirl flow is formed inside the combustion chamber 6.

(a-3) Third Range

Within the third range A3, the control for performing the SPCCI combustion of the mixture gas is executed in the environment in which the air-fuel ratio inside the combustion chamber 6 is slightly richer ($\lambda \leq 1$) than the stoichiometric air-fuel ratio. For example, in order to achieve the SPCCI combustion in such a rich environment, within the third range A3, various components of the engine are controlled by the ECU 100 as follows.

The injector 15 injects all or majority of the fuel for one combustion cycle, during the intake stroke. For example, at an operation point P3 within the third range A3, the injector 15 injects the fuel over a continuous period overlapping with a latter half of the intake stroke, more specifically, a continuous period from the latter half of the intake stroke to an initial stage of the compression stroke, as illustrated in the chart (d) of FIG. 7.

The spark plug 16 ignites the mixture gas near CTDC. For example, at the operation point P3, the spark plug 16 ignites the mixture gas at a slightly retarded timing from CTDC.

The booster 33 is controlled to be ON and performs boosting. The boosting pressure here is adjusted by the bypass valve 39.

The intake VVT 13a and the exhaust VVT 14a set valve operation timings of the intake and exhaust valves 11 and 12 so that the internal EGR is substantially stopped.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda \leq 1$). For example, the EGR valve 53 adjusts the amount of the exhaust gas recirculated through the EGR passage 51 (external EGR gas) so that the air-fuel ratio becomes between 12:1 and 14:1. Note that near a highest engine load, the EGR valve 53 may be closed to substantially stop the external EGR.

The swirl valve 18 is set to have an intermediate opening which is larger than that within the first and second ranges A1 and A2 but smaller than a largest (full) opening.

(a-4) Fourth Range

Within the fourth range A4 on the low-speed, high-load side, a control is executed in which at least a portion of the fuel is injected in the final stage of the compression stroke and the mixture gas is subjected to the SI combustion. For example, in order to achieve the SI combustion accompanied by such a retarded injection, within the third range A3, the various components of the engine are controlled by the ECU 100 as follows.

The injector 15 injects a portion of the fuel to be injected in one combustion cycle during the intake stroke, and injects the rest of the fuel in a final stage of the compression stroke. For example, as illustrated in the chart (e) of FIG. 7, at an operation point P4 within the fourth range A4, the injector 15 performs the first fuel injection in which a relatively large amount of fuel is injected during the intake stroke and performs the second fuel injection in which a smaller amount of fuel than the first fuel injection is injected in the final stage of the compression stroke (immediately before CTDC).

The spark plug 16 ignites the mixture gas at a relatively retarded timing, for example 5° CA to 20° CA from CTDC. Further, this ignition triggers the SI combustion, and all the mixture gas in the combustion chamber 6 combusts through flame propagation. Note that the reason why the ignition timing within the fourth range A4 is retarded as described above is to prevent abnormal combustion, such as knocking and pre-ignition. However, within the fourth range A4, the second fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the second fuel injection to the ignition is sufficiently short, the flow (turbulence kinetic energy) in the combustion chamber 6 at the ignition timing becomes relatively strong, and the combustion speed after the ignition is accelerated using this flow. Thus, the thermal efficiency is kept high while preventing the abnormal combustion.

The booster 33 is controlled to be ON and performs boosting. The boosting pressure here is adjusted by the bypass valve 39.

The throttle valve 32 is fully opened.

The intake VVT 13a and the exhaust VVT 14a set valve operation timings of the intake and exhaust valves 11 and 12 so that the internal EGR is substantially stopped.

The opening of the EGR valve 53 is controlled so that the air-fuel ratio (A/F) in the combustion chamber 6 becomes the stoichiometric air-fuel ratio ($\lambda=1$) or thereabout. For example, the EGR valve 53 adjusts the amount of the exhaust gas recirculated through the EGR passage 51 (external EGR gas) so that the excess air ratio $\lambda$ becomes 1±0.2. Note that near the highest engine load, the EGR valve 53 may be closed to substantially stop the external EGR.

The opening of the swirl valve 18 is set to or near a given intermediate opening (e.g., 50%).

(a-5) Fifth Range

Within a fifth range A5 on the higher speed side of the first to fourth ranges A1 to A4, relatively basic SI combustion is executed. In order to achieve this SI combustion, within the fifth range A5, the various components of the engine are controlled by the ECU 100 as follows.

The injector 15 at least injects the fuel over a given period overlapping with the intake stroke. For example, at an operation point P5 within the fifth range A5, the injector 15 injects the fuel over a continuous period from the intake stroke to the compression stroke, as illustrated in the chart (f) of FIG. 7. Note that at the operation point P5, since it corresponds to a considerably high-speed and high-load condition, the amount of fuel to be injected in one combustion cycle is large and also a crank angle period required for injecting the required amount of fuel becomes long, for which the fuel injection period at the operation point P5 is longer than the other operation points (P1 to P4) described above.

The spark plug 16 ignites the mixture gas near CTDC. For example, at the operation point P5, the spark plug 16 ignites the mixture gas at a slightly advanced timing from CTDC. Further, this ignition triggers the SI combustion, and all the mixture gas in the combustion chamber 6 combusts through flame propagation.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda \leq 1$).

The swirl valve 18 is fully opened. Thus, not only the first intake port 9A but also the second intake port 9B are fully opened and charging efficiency of the engine is improved.

(b) Control in Partially Warmed-Up State

Next, a combustion control in the partially warmed-up state of the engine is described based on the second operation map Q2 (FIG. 5B). When the four operating ranges included in the second operation map Q2 are a sixth range B1, a seventh range B2, an eighth range B3, and a ninth range B4, the sixth range B1 is a combined range of the first and second ranges A1 and A2 of the first operation map Q1 used in the warmed-up state, the seventh range B2 corresponds to the third range A3 of the first operation map Q1, the eighth range B3 corresponds to the fourth range A4 of the first operation map Q1, and the ninth range B4 corresponds to the fifth range A5 of the first operation map Q1.

Within the sixth range B1, similar to the second range A2 in the warmed-up state (first operation map Q1), the control for performing the SPCCI combustion of the mixture gas is executed in the environment in which the air-fuel ratio inside the combustion chamber 6 is substantially the stoichiometric air-fuel ratio ($\lambda=1$). Since the control of the sixth range B1 is basically similar to the control described in (a-2) (the control within the second range A2 in the warmed-up state), the description is omitted here.

Further, since controls within the other ranges B2 to B4 are similar to those within the ranges A3 to A5 in the warmed-up state (first operation map Q1) (described in (a-3) to (a-5)), the description is also omitted.

(c) Control in Cold State

Next, a combustion control in the cold state of the engine is described with reference to the third operation map Q3 (FIG. 5C). When the two operating ranges within the third operation map Q3 are a tenth range C1 and an eleventh range C2, the tenth range C1 corresponds to the first, second, third, and fifth ranges A1, A2, A3, and A5 of the first operation map Q1 used in the warmed-up state, and the eleventh range C2 corresponds to the fourth range A4 of the first operation map Q1.

Within the tenth range C1, mainly a control in which the fuel injected on the intake stroke is mixed with air and subjected to the SI combustion is executed. Since the control within this tenth range C1 is similar to a combustion control of a general gasoline engine, the description is omitted here.

Further, since a control within the eleventh range C2 is similar to that within the fourth range A4 in the warmed-up state (first operation map Q1) (described in (a-4)), the description is also omitted.

(4) About SI Ratio

As described above, in this embodiment, within some operating ranges (the first to third ranges A1 to A3 of the first operation map Q1 and the sixth and seventh ranges B1 and B2 of the second operation map Q2), the SPCCI combustion combining the SI combustion and the CI combustion is performed. In this SPCCI combustion, it is important to control the ratio of the SI combustion with the CI combustion according to the operating condition.

In this embodiment, as this ratio, an SI ratio which is a ratio of a heat generation amount by the SI combustion to the total heat generation amount by the SPCCI combustion (the SI combustion and the CI combustion) is used. FIG. 8 is a chart illustrating this SI ratio and illustrating a change in the heat generation rate (J/deg) according to the crank angle when the SPCCI combustion occurs. The flection point X in the waveform of FIG. 8 is a flection point appearing when the combustion mode switches from the SI combustion to the CI combustion and the crank angle θci corresponding to this flection point X may be defined as the start timing of CI combustion. Further, an area R1 of the waveform of the heat generation rate located on the advance side of this θci (the start timing of CI combustion) is set as the heat generation amount by the SI combustion, and an area R2 of the waveform of the heat generation rate located on the retarding side of θci is the heat generation rate by the CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

The SI ratio is in correlation with a combustion center of gravity which is a timing when a half of the total mass (50% mass) of the fuel injected into the combustion chamber 6 in one combustion cycle combusts. For example, since a ratio of the CI combustion at which the mixture gas combusts at a plurality of positions simultaneously increases as the SI ratio decreases, an average combustion speed increases, and the combustion center of gravity advances to approach CTDC. This leads to improving the thermal efficiency but also leads to increasing the combustion noise. On the contrary, since the average combustion speed decreases as the SI ratio increases (as the ratio of the CI combustion decreases), the combustion center of gravity retards to move away from CTDC. This leads to reducing the combustion noise but also leads to degrading the thermal efficiency. In this embodiment, in consideration of such a correlation between the SI ratio and the combustion center of gravity, an optimal combustion center of gravity at which high thermal efficiency is obtained while having the combustion noise below an allowable level is determined as a target combustion center of gravity in advance and an optimal SI ratio corresponding to the target combustion center of gravity is determined as a target SI ratio in advance.

Here, the target combustion center of gravity changes according to the operating condition (speed/load) of the engine. For example, in a high engine load condition in which the heat generation amount is large, since the fuel injection amount is large and a total amount of heat generation within the combustion chamber 6 is large (i.e., the combustion noise easily increases), compared to in a low engine load condition in which the heat generation amount is small, the combustion center of gravity needs to be greatly retarded from CTDC in order to reduce the combustion noise. On the contrary, in the low engine load condition, compared to in the high engine load condition, the heat generation amount is small and the combustion noise does not easily increase. Therefore, it is desirable to set the combustion center of gravity to the advancing side in order to improve the thermal efficiency. For this reason, the target combustion center of gravity is comprehensively set further on the retarding side as the engine load is higher (i.e., further on the advancing side as the engine load is lower). Further, since the progression amount of crank angle per unit time changes according to the engine speed, the optimal combustion center of gravity taking noise and thermal efficiency into consideration also changes according to the engine speed. Therefore, the target combustion center of gravity is set variably also in accordance with the engine speed in addition to the engine load.

As described above, the target combustion center of gravity changes according to the operating condition (speed/load) of the engine. In other words, the combustion center of gravity is desirably fixed when the engine speed and engine load are under the same condition. Therefore, in this embodiment, the target combustion center of gravity for the case where the engine speed and engine load are in the same condition is set the same regardless of the mode of the SPCCI combustion. For example, even while the SPCCI combustion is performed in the warmed-up state of the engine (while operating within the first to third ranges A1 to A3 of the first operation map Q1), or even while the SPCCI combustion is performed in the partially warmed-up state of the engine (while operating within the first and second ranges B1 and B2 of the second operation map Q2), the target combustion center of gravity is fixed if the engine speed and engine load are in the same condition. Further, although one of the first and second modes is selected within the first range A1 of the first operation map Q1, regardless of which mode the SPCCI combustion is performed, the target combustion center of gravity is still the same as long as the engine speed and engine load are in the same condition.

As described above, since the target combustion center of gravity in the SPCCI combustion changes according to the engine speed and engine load, the target SI ratio is also set variably according to the engine speed and engine load. For example, since the target combustion center of gravity is set further on the retarding side as the engine load is higher as described above, the target SI ratio is set higher as the engine load is higher (i.e., the ratio of the CI combustion decreases as the engine load increases). Further, since the target combustion center of gravity is located at the same position when the engine speed and engine load are the same regardless of the mode of the SPCCI combustion (the warmed-up/partially warmed-up state, or the first/second mode within the first range A1), the target SI ratio is accordingly fixed when the engine speed and engine load are in the same condition.

Moreover in this embodiment, target values of control amounts, such as the ignition timing of the spark plug 16, the fuel injection amount/timing, and in-cylinder state functions, are determined in advance according to the respective operating conditions (engine speed/load) so that the target combustion center of gravity and the target SI ratio which are set as described above are achieved. Note that the in-cylinder state functions referred to here include, for example, the temperature in the combustion chamber 6 and an EGR ratio. The EGR ratio includes an external EGR ratio which is a ratio of the external EGR gas (exhaust gas recirculated to the combustion chamber 6 through the EGR passage 51) to all the gas in the combustion chamber 6, and an internal EGR ratio which is a ratio of the internal EGR gas (burned gas remaining in the combustion chamber 6) to all the gas in the combustion chamber 6.

For example, as the ignition timing (the timing of spark-ignition) of the spark plug 16 is advanced, a larger amount of fuel is combusted in the SI combustion, and the SI ratio increases. Further, as the injection timing of the fuel is advanced, a larger amount of fuel is combusted in the CI combustion, and the SI ratio decreases. Alternatively, as the temperature of the combustion chamber 6 rises, a larger amount of fuel is combusted in the CI combustion, and the SI ratio decreases. Moreover, since a change in the SI ratio is followed by a change in the combustion center of gravity, changes in these control amounts (the ignition timing, the injection timing, the in-cylinder temperature, etc.) are factors for adjusting the combustion center of gravity.

Based on such a tendency, in this embodiment, the target values of the ignition timing, the fuel injection amount and timing, and the in-cylinder state functions (temperature, EGR ratio, etc.) are determined in advance for each operating condition so as to achieve a combination of values achievable of the target combustion center of gravity and the target SI ratio described above. In the operation with the SPCCI combustion (i.e., in the operation within the first to third ranges A1 to A3 of the first operation map Q1 or the first and second ranges B1 and B2 of the second operation map Q2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and timing. Further, the EGR valve 53 and the intake and exhaust VVTs 13a and 14a are controlled based on the respective target values of the temperature of the combustion chamber 6 and the EGR ratio, and the recirculation amount of exhaust gas (external EGR gas) through the EGR passage 51 and the residual amount of burned gas (internal EGR gas) by the internal EGR are adjusted.

Note that in this embodiment in which the target combustion center of gravity and the target SI ratio are determined in advance for each operating condition of the engine, the start timing θci of the CI combustion when the combustion conforming to the target combustion center of gravity and the target SI ratio is performed is also necessarily determined in advance. In the following description, the start timing of CI combustion determined based on the target combustion center of gravity and the target SI ratio is referred to as standard θci. This standard θci serves as a reference for determining a target θci in a flowchart (S13 in FIG. 9) described later.

(5) Control in SPCCI Combustion According to Noise Index Value

In the SPCCI combustion combining the SI combustion and the CI combustion, knocking may occur due to the respective SI combustion and CI combustion, and these respective knockings become the cause of an increase in combustion noise. When knocking caused by the SI combustion is SI knock and knocking caused by the CI combustion is CI knock, the SI knock means a phenomenon in which the unburned gas outside the area where the SI combustion of the mixture gas occurs combusts rapidly by abnormal, local self-ignition (local self-ignition which is clearly different from normal CI combustion), and the CI knock is a phenomenon in which main components of the engine (cylinder block/head, piston, crank journal part, etc.) resonate due to a pressure fluctuation by the CI combustion. The SI knock occurs as loud noise at a frequency of approximately 6.3 kHz due to vibration of air column inside the combustion chamber 6 occurring by the local self-ignition. On the other hand, the CI knock occurs as loud noise at a frequency within a range of approximately 1 to 4 kHz (more specifically, a plurality of frequencies included in this range) due to the resonance of the main components of the engine. Thus, the SI knock and the CI knock occur as noises at different frequencies caused by different reasons, and the frequency of the noise in the CI knock is lower than the frequency of the noise in the SI knock.

Since such SI knock and CI knock are both perceived as harsh noise to person(s) in a cabin, the SPCCI combustion is controlled so that the SI knock and the CI knock are both reduced. However, according to the present inventors' knowledge, it is known that controlling the SPCCI combustion to have the noise caused by the CI knock below its allowable level necessarily brings the noise caused by the SI knock below its allowable level as well. Therefore, in this embodiment, the level of noise caused by the CI knock (noise of a frequency of approximately 1 to 4 kHz) is detected as a noise index value, and the SPCCI combustion is controlled based on this noise index value. As will be described later in detail, the noise index value is calculated by performing a Fourier transform on a detected waveform by the in-cylinder pressure sensor SN3.

Figure 9:
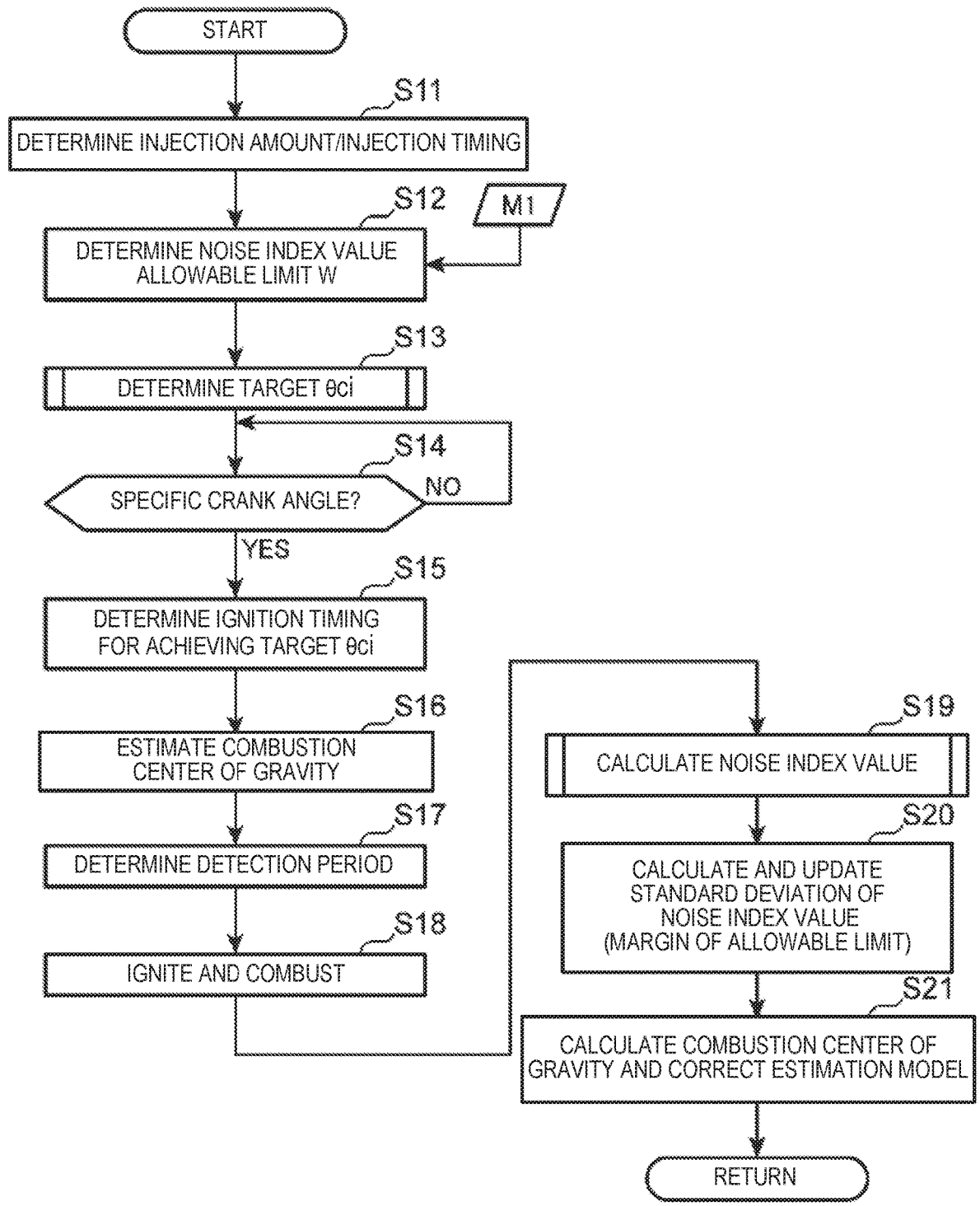
FIG. 9 is a flowchart illustrating details of a control executed in the SPCCI combustion.

FIG. 9 is a flowchart illustrating a specific procedure of the control executed by the ECU 100 in the SPCCI combustion, that is, in the operation within the first to third ranges A1 to A3 of the first operation map Q1 (in the warmed-up state) illustrated in FIG. 5A and in the operation within the sixth and seventh ranges B1 and B2 of the second operation map Q2 (in the partially warmed-up state) illustrated in FIG. 5B. When the control illustrated in this flowchart starts, at S11, the ECU 100 determines the fuel injection amount from the injector 15 and its injection timing based on the engine speed detected by the crank angle sensor SN1 and the engine load which is specified by the detection value of the accelerator sensor SN10 (accelerator opening), the detection value of the airflow sensor SN4 (intake flow rate), etc. Note that as described in Section (4) above, in this embodiment, the target combustion center of gravity and the target SI ratio are determined in advance for each operating condition of the engine, and the fuel injection amount and timing for achieving the target combustion center of gravity and the target SI ratio are determined in advance for each operating condition of the engine. The fuel injection amount and timing determined at S11 is the injection amount and timing for achieving the target combustion center of gravity and the target SI ratio.

Figure 12:
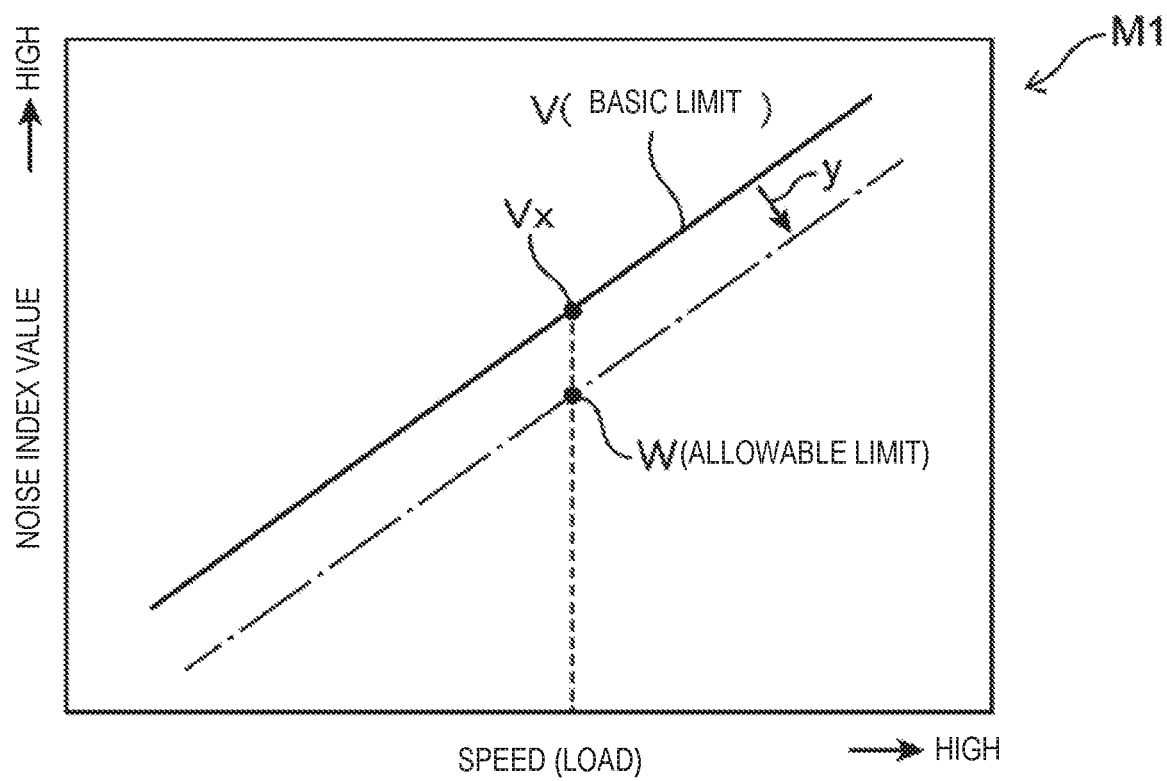
FIG. 12 is a map used for determining an allowable limit of a noise index value.

Next, the ECU 100 shifts to S12 to determine an allowable limit W which is an upper limit of the noise index value allowable under the current operating condition (FIG. 12). Note that the allowable limit W corresponds to "given threshold."

Specifically, at S12, the ECU 100 specifies the allowable limit W of the noise index value based on the engine speed detected by the crank angle sensor SN1, the engine load specified based on the detection value of the accelerator sensor SN10 (accelerator opening), etc., and a map M1 illustrated in FIG. 12.

The map M1 of FIG. 12 is a map in which a basic limit V of the noise index value is defined for each engine speed/load and stored in the ECU 100 in advance. In the map M1, the basic limit V of the noise index value is determined so as to become larger as the engine speed and load become higher. That is, the basic limit V increases when one of the engine speed and load is increased, takes a lowest value under the low-speed low-load condition in which the engine speed and load are both low, and takes a highest value under the high-speed high-load condition in which the engine speed and the engine load are both high. This is because it becomes easier to detect even small noise, as the engine speed and load are lower (in other words, it becomes more difficult to detect even large noise, as the engine speed and load are higher).

At S12, the ECU 100 specifies the basic limit Vx of the noise index value corresponding to the current operating condition by comparing the current engine operating condition (engine speed/load) specified based on the detection values of the sensors SN1 and SN10, etc. to the map M1 of FIG. 12. The allowable limit W of the noise index value is determined based on the basic limit Vx and a margin "y" which is obtained based on a variation of the noise index value acquired previously. That is, the basic limit Vx of the noise index value corresponding to the current operating condition is specified using the map M1 (FIG. 12) and a value obtained by subtracting from the basic limit Vx the margin y, which is based on the variation of the noise index value acquired previously, is determined as the allowable limit W of the noise index value.

Note that the margin y which is subtracted from the basic limit Vx in the above processing is obtained from a history of the noise index value acquired previously (S20 described later), and corresponds to a standard deviation of noise index values accumulated in the past over a given period. The allowable limit W is determined in consideration of the variation (standard deviation) in the noise index value as described above because, if the allowable limit of the noise index value is fixed in disregard of the variation in noise in each combustion cycle, a possibility that the combustion accompanied by loud noise exceeding the allowable limit incidentally occurs becomes high. In other words, the allowable limit W is set in consideration of the variation (standard deviation) in the above manner so as to ensure that combustion accompanied by loud noise exceeding the allowable limit does not occur in any combustion cycle regardless of the degree of the variation in the noise.

Next, the ECU 100 shifts to S13 to determine the target $\theta ci$ which is a target start timing of the CI combustion. This target $\theta ci$ is a target value of the crank angle (the crank angle $\theta ci$ illustrated in FIG. 8) at which the SI combustion is switched to the CI combustion, and is determined so as to make the noise index value below the allowable limit W.

Figure 10:
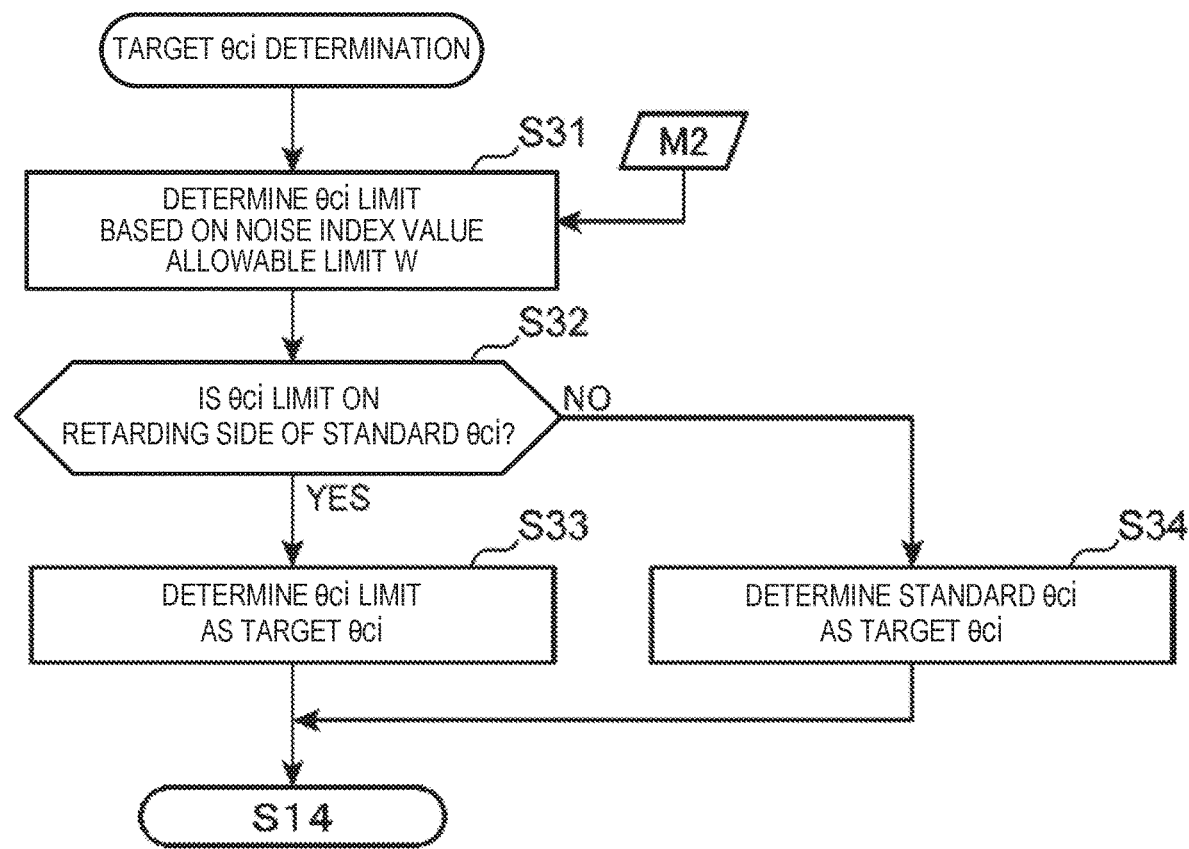
FIG. 10 is a subroutine illustrating details of the control at S13 of FIG. 9.

FIG. 10 is a subroutine illustrating details of a control at S13 where the target $\theta ci$ is determined. Once the control in this subroutine is started, at S31, the ECU 100 determines a $\theta ci$ limit which is a limit of the start timing of the CI combustion by which the noise index value is made below the allowable limit W, based on the engine speed detected by the crank angle sensor SN1, the engine load specified based on the detection value of the accelerator sensor SN10, etc., the allowable limit W of the noise index value determined at S12, and a map M2 illustrated in FIG. 13.

Figure 13:
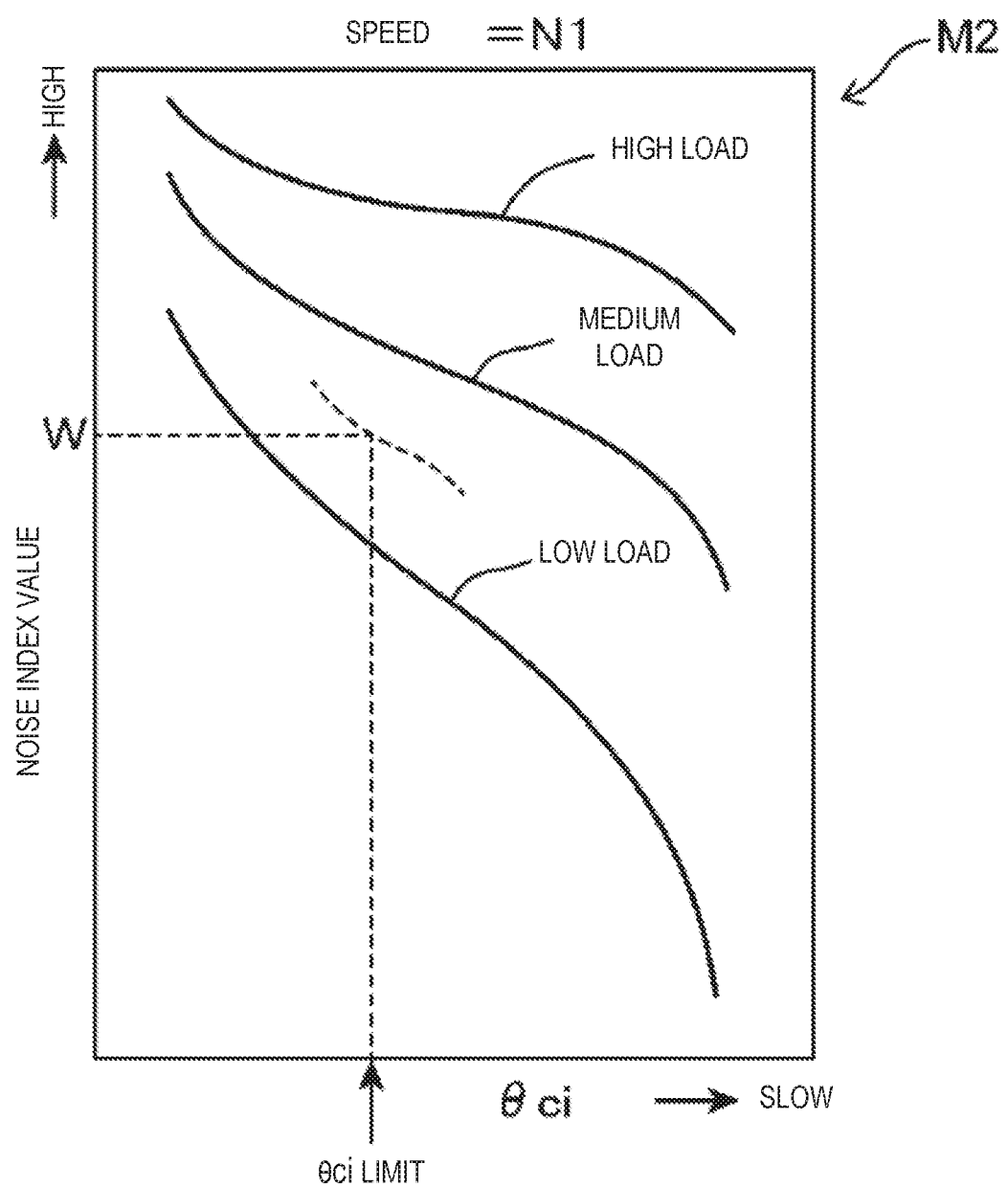
FIG. 13 is a map defining a relationship between a start timing (θci) of CI combustion and the noise index value.

The map M2 of FIG. 13 is a map defining a standard relationship between $\theta ci$ (the start timing of the CI combustion) and the noise index value, and is stored in the ECU 100 in advance. More specifically, the map M2 defines a standard characteristic of the noise index value obtained when the engine load is variously changed while keeping the engine speed (N1), and the horizontal axis indicates $\theta ci$ and the vertical axis indicates the noise index value (estimated value). Note that although in FIG. 13, only three types of loads, the low load, the medium load, and the high load are illustrated for the sake of convenience, the characteristics other than the three types of loads are also included in the map M2. Moreover, although the engine speed is fixed (N1) in the map M2, maps created for other various engine speeds are also stored in the ECU 100 same as the map M2. When the engine speed/load is not specified in the map M2, the noise index value may be estimated by, for example, linear interpolation. As described above, in this embodiment, when $\theta ci$ is changed under various conditions with different engine speeds/loads, how the noise index value changes accordingly is estimated using the map M2 of FIG. 13.

At S31, the ECU 100 compares the allowable limit W of the noise index value determined at S12 with the map M2 in FIG. 13 to specify $\theta ci$ so that the noise index value matches with the allowable limit W, and this $\theta ci$ is determined as the $\theta ci$ limit described above.

Next, the ECU 100 shifts to S32 to determine whether the $\theta ci$ limit determined at S31 is on the retarding side of a given standard $\theta ci$. Note that the standard $\theta ci$ used here is, as described in Section (4) above, the start timing of the CI combustion obtained when the combustion with the target combustion center of gravity and the target SI ratio determined for each operating condition (in other words, targeted SPCCI combustion) is achieved.

If S32 is YES and it is confirmed that the $\theta ci$ limit is on the retarding side of the standard $\theta ci$, the ECU 100 shifts to S33 to determine the $\theta ci$ limit as the target $\theta ci$.

On the other hand, if S32 is NO and it is confirmed that the $\theta ci$ limit is not on the retarding side of the standard $\theta ci$, in other words, the $\theta ci$ limit is the same as or on the advancing side of the standard $\theta ci$, the ECU 100 shifts to S34 to determine the standard $\theta ci$ as the target $\theta ci$.

Once the determination process of the target $\theta ci$ is thus completed, the ECU 100 shifts to S14 of FIG. 9 to determine whether the crank angle is at a specific angle based on the detection value of the crank angle sensor SN1. This specific crank angle is determined in advance as the timing for determining the ignition timing by the spark plug 16, for example, about 60° CA before CTDC.

If S14 is YES and the crank angle is confirmed to be at the specific angle, the ECU 100 shifts to S15 to determine an ignition timing for achieving the target $\theta ci$ determined at S13. Here, in this embodiment, for each operating condition of the engine, the target values of the target combustion center of gravity, the target SI ratio, the standard $\theta ci$ corresponding to the target combustion center of gravity and the target SI ratio, the ignition timing for achieving the standard $\theta ci$, the fuel injection amount, the fuel injection timing, and the in-cylinder state functions (temperature, EGR ratio, etc.) are determined in advance, and the ignition timing is determined based on these target values. For example, the ignition timing for achieving the target $\theta ci$ is determined based on a deviation of the standard $\theta ci$ from the target $\theta ci$ and the in-cylinder state functions at the specific crank angle timing.

That is, as the deviation of the standard $\theta ci$ from the target $\theta ci$ is larger, the ignition timing needs to be deviated greater from an initial target value of the ignition timing determined corresponding to the standard $\theta ci$ (hereinafter, referred to as "default ignition timing"). Further, as the in-cylinder state functions at the specific crank angle timing deviate greater from the target values, the ignition timing still needs to be deviated greater from the default ignition timing. On the other hand, as described at S11, in this embodiment, since the initial target values are adopted as they are as the fuel injection amount and the fuel injection timing, the deviations of the fuel injection amount and the fuel injection timing are not required to be taken into consideration. At S15, by using a given arithmetic expression prepared in advance in view of the above situation, the ignition timing of the spark plug 16 is determined based on the deviation of the standard θci from the target θci and the deviation of the in-cylinder state functions from the target value. The in-cylinder state functions, that is, the temperature of the combustion chamber 6, the EGR ratio, etc. may be estimated based on, for example, the detection values of the second intake air temperature sensor SN7, the second intake air pressure sensor SN8, the pressure difference sensor SN9, etc. Note that when the target θci is the same as the standard θci and the in-cylinder state functions at the specific crank angle timing is the same as the target value, the default ignition timing is adopted as the ignition timing as it is.

Next, the ECU 100 shifts to S16 to estimate a combustion center of gravity which is a timing when a half of the mass (50% mass) of the total fuel injected into the combustion chamber 6 in one combustion cycle combusts, based on the fuel injection amount and the fuel injection timing determined at S11, the ignition timing determined at S15, and the in-cylinder state functions at the specific crank angle timing, and the engine speed. The estimation processing at S16 is performed based on an estimation model prepared in advance.

Next, the ECU 100 shifts to S17 to determine a given period including the combustion center of gravity estimated at S16 as a period in which the in-cylinder pressure for calculating the noise index value at S19 described later is detected. The period in which the in-cylinder pressure is detected (hereinafter, referred to as "detection period") is determined to be a finite and continuous period including the combustion center of gravity. The detection period may be a period set based on time, or may be a period set based on the crank angle. In the case of using the crank angle, for example, a period from the crank angle advancing by 40° CA from the combustion center of gravity to the crank angle retarding by 40° CA therefrom as the detection period (see FIG. 14 described later).

Next, the ECU 100 shifts to S18 to cause the spark plug 16 to ignite at the ignition timing determined at S15, so as to trigger the SPCCI combustion of the mixture gas.

Next, the ECU 100 shifts to S19 to calculate the noise index value based on the waveform of the in-cylinder pressure detected by the in-cylinder pressure sensor SN3 during the detection period determined at S17.

Figure 11:
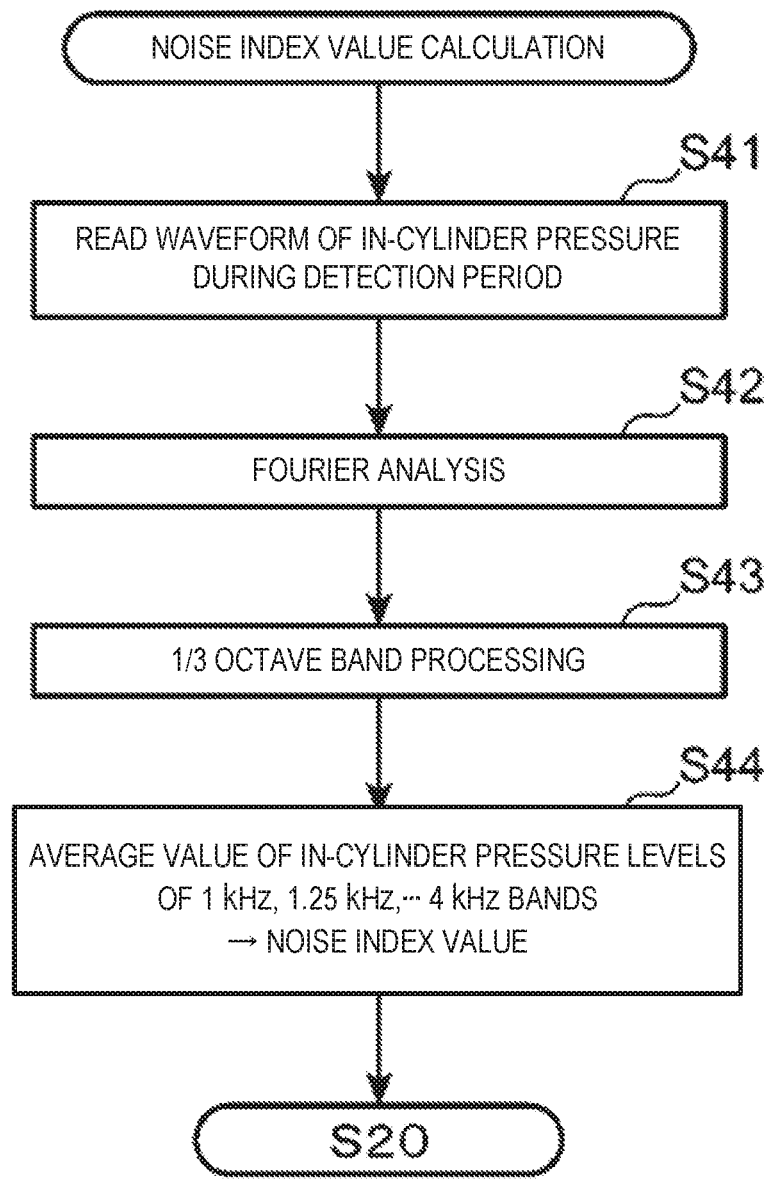
FIG. 11 is a subroutine illustrating details of the control at S19 of FIG. 9.

FIG. 11 is a subroutine illustrating details of a control at S19 where the noise index value is calculated. When the control illustrated in this subroutine starts, at S41, the ECU 100 reads the waveform of the in-cylinder pressure detected by the in-cylinder pressure sensor SN3 during the detection period.

Figure 14:
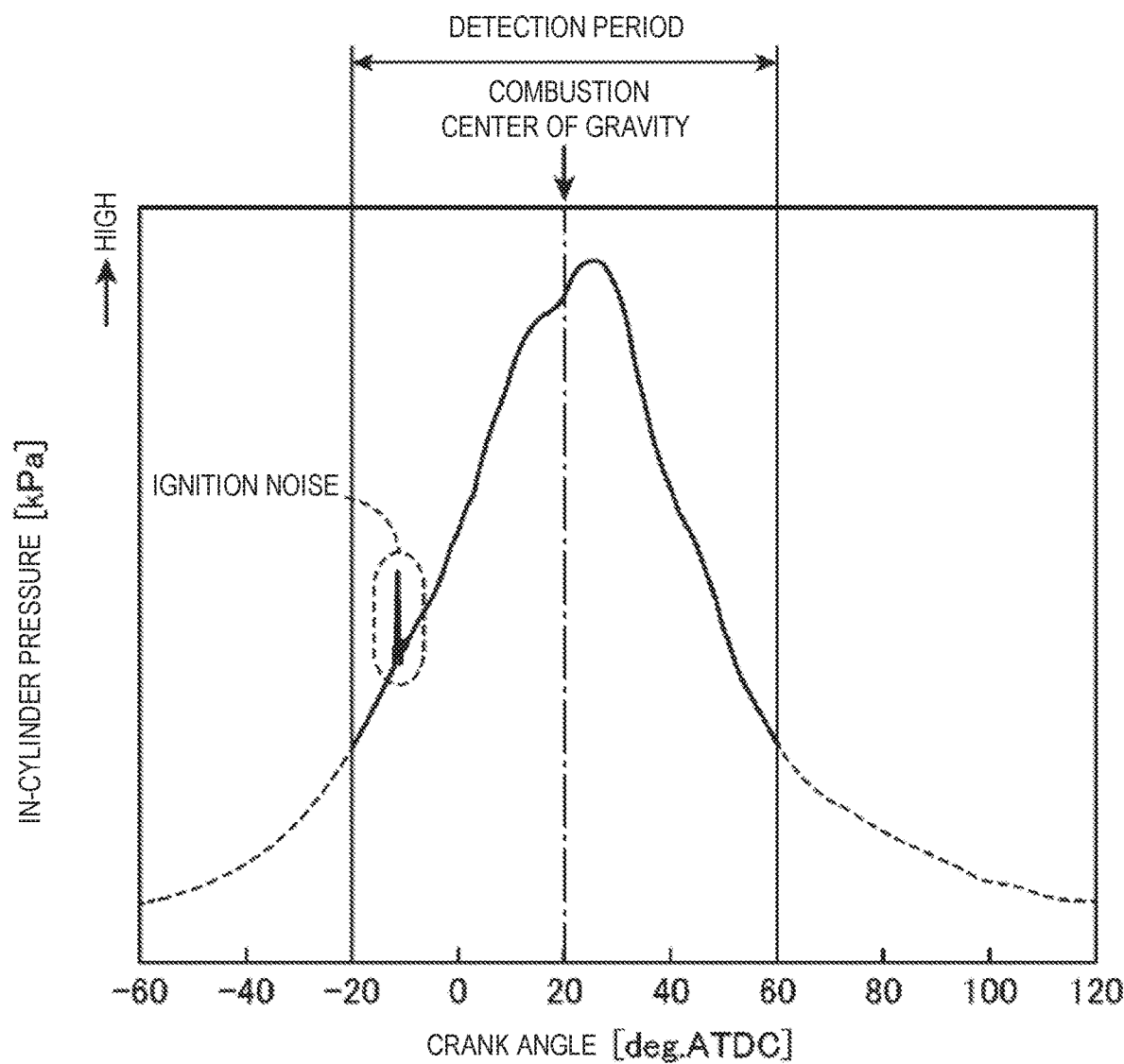
FIG. 14 is a chart illustrating a waveform of in-cylinder pressure detected by an in-cylinder pressure sensor.

FIG. 14 is a chart illustrating one example of the waveform of the in-cylinder pressure read at S41. Note that the crank angle displayed on the horizontal axis of the chart is the crank angle (deg. ATDC) when CTDC is 0° CA. In this example, the combustion center of gravity is estimated to be around ATDC 20° CA, and a period including 40° CA before and after the combustion center of gravity (a period from ATDC 20° CA to ATDC 60° CA) is set as the detection period. The detected waveform within this detection period includes ignition noise which is noise caused by the ignition of the spark plug 16.

Next, the ECU 100 shifts to S42 to perform Fourier-analysis on a detected waveform of the in-cylinder pressure read at S41 and obtain an amplitude for each frequency component. Note that as pre-processing of the Fourier analysis, processing of applying a window function for removing the ignition noise is performed on the detected waveform of the in-cylinder pressure. For example, a function generally used for Fourier analysis (e.g., Hanning window function) may be modified so that the function value becomes zero for a given period set around the ignition timing, and it may be used as the window function.

Figure 15:
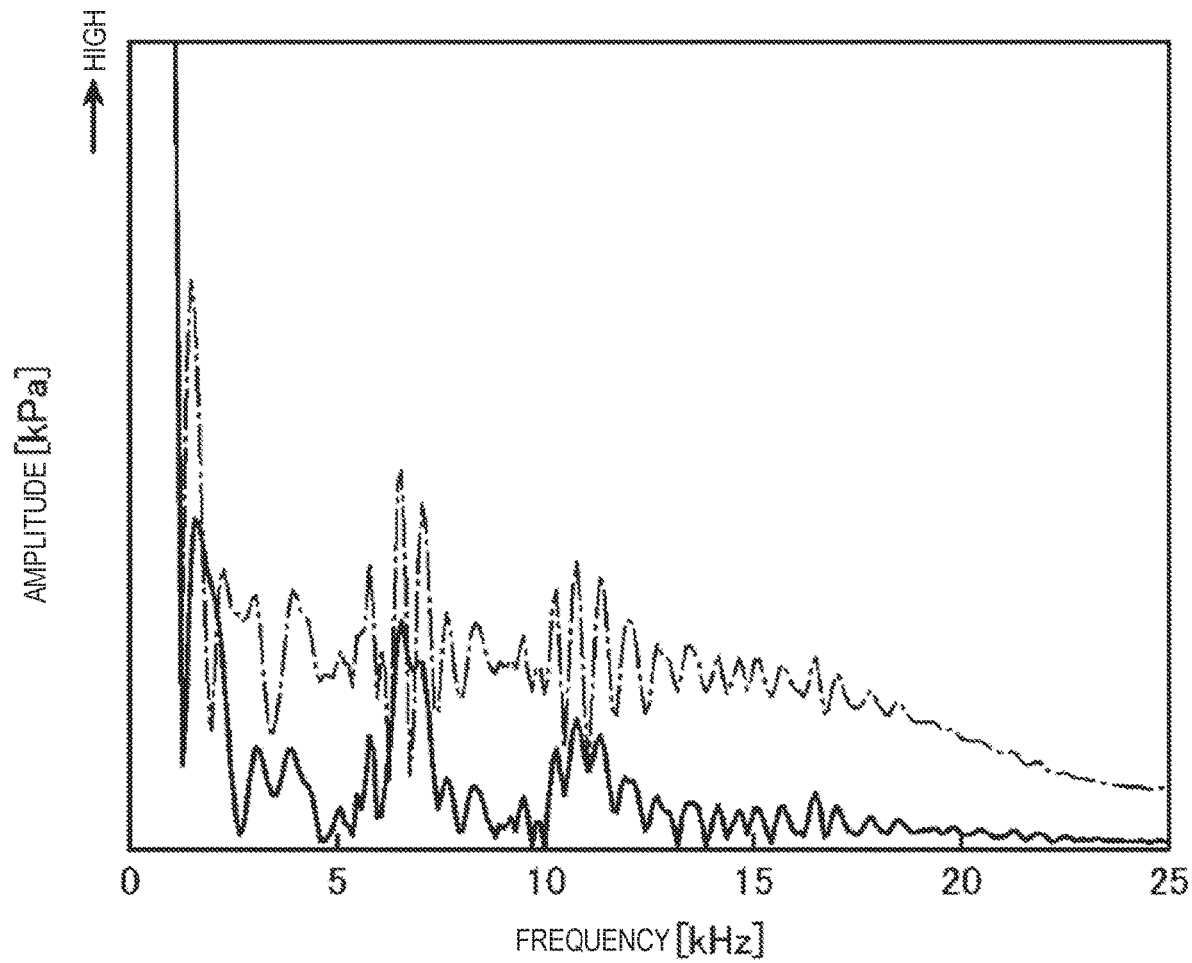
FIG. 15 is a chart illustrating a result of performing Fourier analysis on the pressure waveform of FIG. 14.

FIG. 15 is a chart illustrating a frequency spectrum obtained by the Fourier analysis performed at S42. Since the ignition noise is removed from the detected waveform by the pre-processing (the application of the window function) in the Fourier analysis as described above, the frequency spectrum obtained by Fourier-analyzing the waveform after the ignition noise removal (solid line) is different from a frequency spectrum obtained in a case where the ignition noise is not removed (dashed line). That is, according to the method of at S42 where the ignition noise is removed and then the Fourier analysis is conducted, unnecessary frequency components caused by the ignition noise do not mix in and the original frequency component in the waveform of the in-cylinder pressure is accurately extracted.

Figure 16:
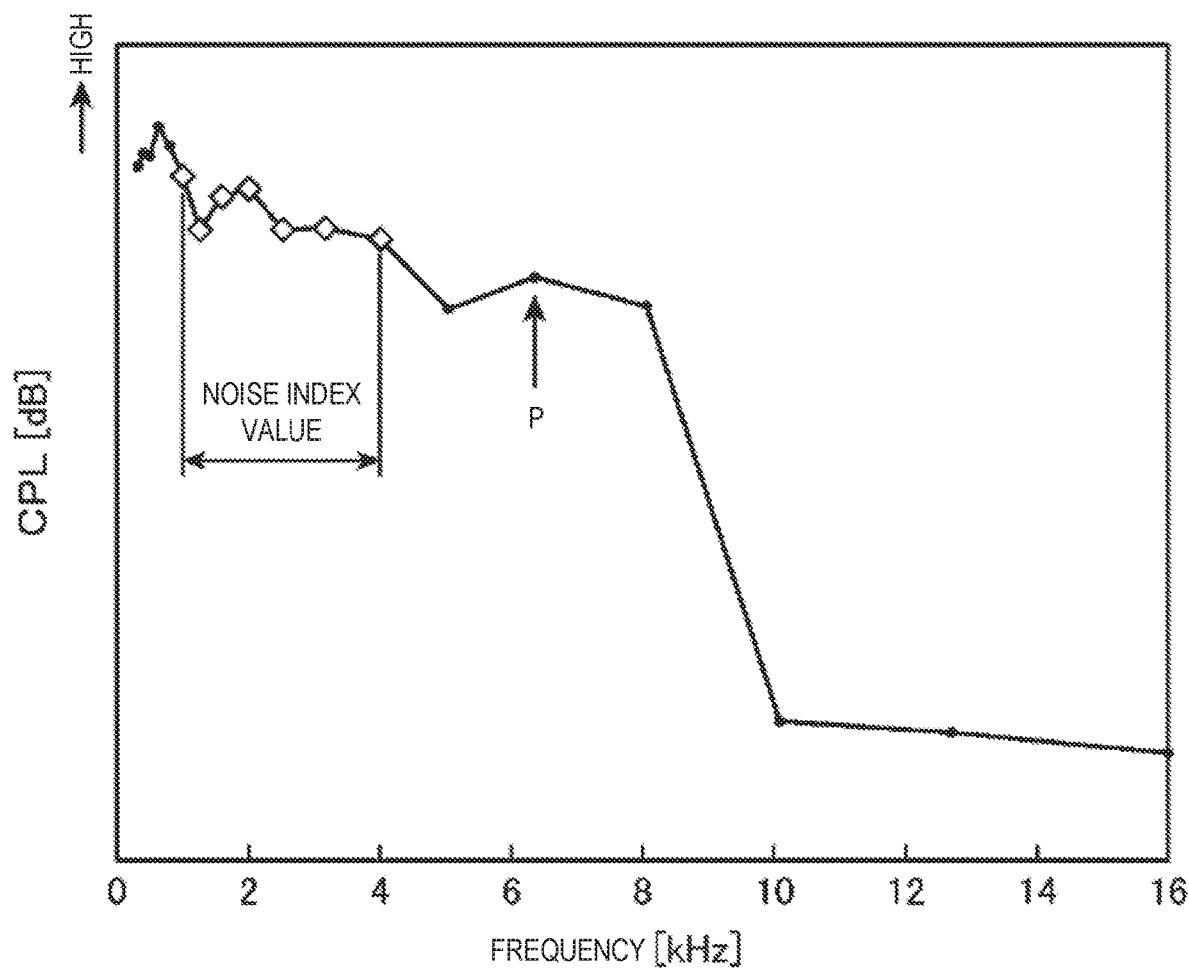
FIG. 16 is a chart illustrating a result of performing ⅓ octave band processing on a frequency spectrum of FIG. 15.

Next, the ECU 100 shifts to S43 to perform ⅓ octave band processing on the result of the Fourier analysis at S42 (frequency spectrum). The ⅓ octave band processing is processing of dividing each octave range (a range from a certain frequency to a frequency twice thereof) of the frequency spectrum into three and calculating an in-cylinder pressure level (CPL) of each divided band. Thus, as illustrated in FIG. 16, for example, the in-cylinder pressure level of each of the bands having center frequencies of 1 kHz, 1.25 kHz, 1.6 kHz, 2 kHz, 2.5 kHz, 3.15 kHz, 4 kHz, 5 kHz, 6.3 kHz, 8.0 kHz, . . . , respectively, is specified.

Subsequently, the ECU 100 shifts to S44 to calculate the noise index value based on the result of the ⅓ octave band processing (FIG. 16) at S43. For example, the ECU 100 calculates, as the noise index value, an average value of in-cylinder pressures indicated by diamond shaped plots in FIG. 16, i.e., the in-cylinder pressure levels of the bands having the center frequencies of 1 kHz, 1.25 kHz, 1.6 kHz, 2 kHz, 2.5 kHz, 3.15 kHz, and 4 kHz.

Here, the noise having a frequency of 1 to 4 kHz is highly correlated with the CI knock caused by the CI combustion, as described above. However, it is known that if this noise of 1 to 4 kHz is sufficiently reduced, the SI knock caused by the SI combustion and noise near 6.3 kHz, which is highly correlated with SI knock are also sufficiently reduced. In other words, although the noise of 1 to 4 kHz originally indicates the noise equivalent to about the CI knock, due to the above circumstances, it can be treated as noise indicating that equivalent to both CI knock and SI knock. Therefore, in this embodiment, an average value of the in-cylinder pressure levels in the bands of 1 to 4 kHz (1 kHz, 1.25 kHz, . . . , 4 kHz) is calculated and used as the noise index value for reducing the CI knock and the SI knock. On the other hand, the in-cylinder pressure level in the 6.3 kHz band (labeled as "P" in FIG. 16) is not considered as the noise index value.

Once the calculation of the noise index value is completed as described above, the ECU 100 shifts to S20 of FIG. 9 to calculate and update the standard deviation of the noise index value based on the latest noise index value calculated at S44 and the plurality of noise index values accumulated previously. Next, the standard deviation updated in this manner is used as the margin y (FIG. 12) when determining the allowable limit W of the noise index value. Note that the standard deviation of the noise index value may be obtained from the noise index values accumulated, for example, over a latest given period or separately for every similar operating condition.

Next, the ECU 100 shifts to S21 to calculate the combustion center of gravity based on the waveform of the in-cylinder pressure during the detection period and correct the estimation model of the combustion center of gravity based on the calculated combustion center of gravity. That is, the ECU 100 calculates the heat generation amount accompanying the combustion for each crank angle based on the waveform of the in-cylinder pressure detected by the in-cylinder pressure sensor SN3 during the detection period, and the combustion center of gravity at the timing when 50% mass of the fuel combusts is calculated based on the data of the heat generation amount for each crank angle. Further, the estimation model for estimating the combustion center of gravity is corrected based on the deviation between this calculated combustion center of gravity and the combustion center of gravity estimated at S16. The correction of this estimation model leads to improving the accuracy in estimating the combustion center of gravity under the similar condition next time and thereafter (the reduction of the deviation between the estimated value and the actual value).

(6) Mode Switch Control in Warmed-Up State

As described in (a-1) of Section (3), in the warmed-up state of the engine, the first operation map Q1 illustrated in FIG. 5A is selected, and when operating within the first range A1 of the first operation map Q1, the SPCCI combustion is performed in one of the two modes (first/second mode) with different air-fuel ratios (A/F) selectively. Next, details of this mode switching will be described with reference to the flowcharts of FIGS. 17 and 18.

Figure 17:
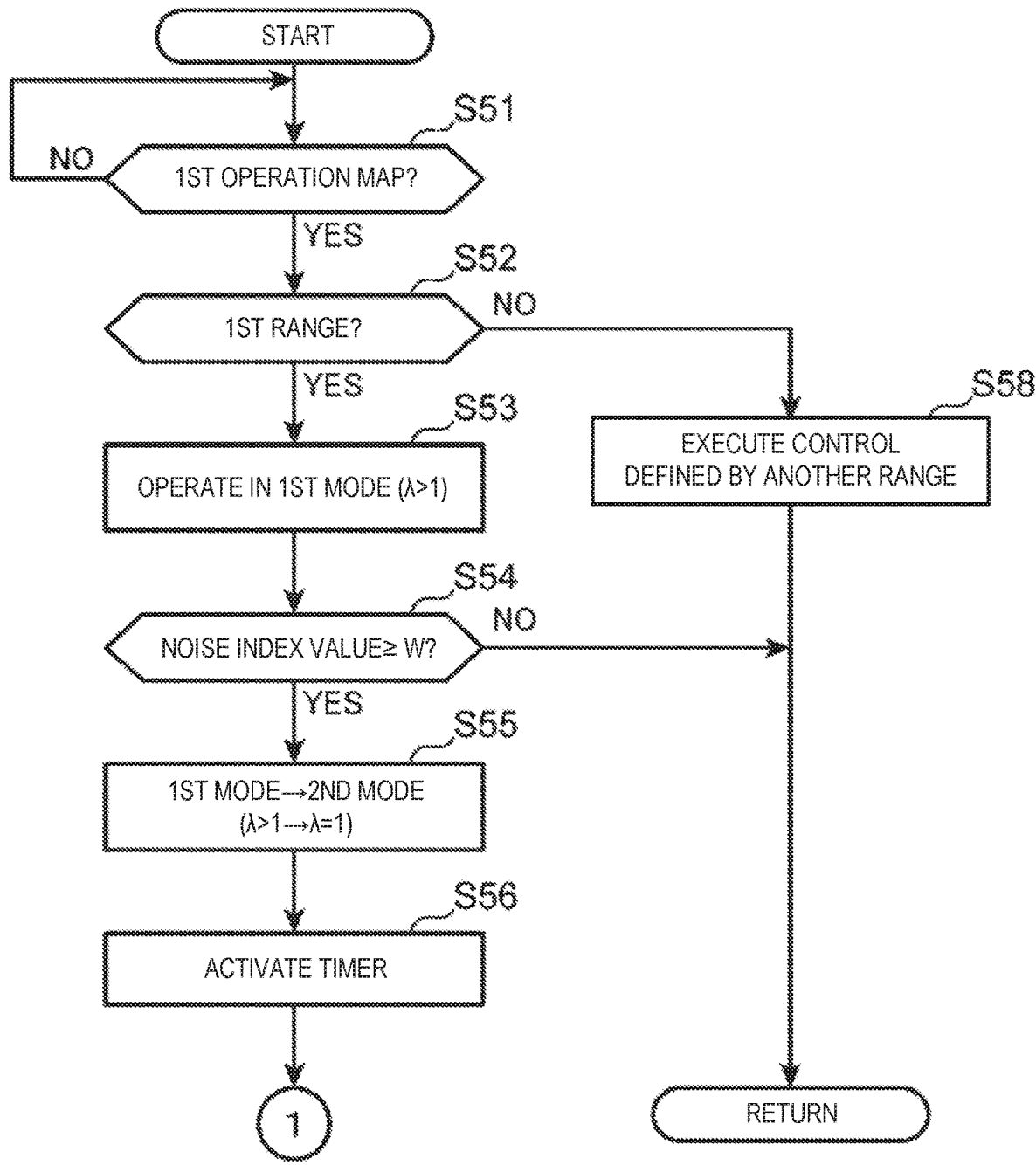
FIG. 17 is a first part of a flowchart illustrating details of a control executed within a first range of the first operation map.

When the control illustrated in the flowchart of FIG. 17 starts, at S51, the ECU 100 determines whether the first operation map Q1 (FIG. 5A) is selected as the current operation map, that is, whether the engine is in the warmed-up state (a state where one of the engine water temperature≥80° C. and the intake air temperature≥50° C. is established).

When S51 is YES and it is confirmed that the first operation map Q1 is selected, the ECU 100 shifts to S52 to determine whether the engine is operated within the first range A1 of the first operation map Q1. That is, based on the engine speed detected by the crank angle sensor SN1 and the engine load specified by the detection value of the accelerator sensor SN10 (accelerator opening), the detection value of the airflow sensor SN4 (intake flow rate), etc., the ECU 100 specifies the current operation point of the engine and determines whether the operation point is within the first range A1 of the first operation map Q1.

If S52 is NO and it is confirmed that the operation point is outside the first range A1, the ECU 100 shifts to S58 to execute a control defined by the operating range corresponding to the outside the first range A1 (one of the second to fifth ranges A2 to A5).

On the other hand, when S52 is YES and it is confirmed that the operation point is within the first range A1, the ECU 100 shifts to S53 to select, as one of the two combustion modes defined within the first range A1, the first mode in which the SPCCI combustion is performed in the lean air-fuel ratio environment in which the excess air ratio $\lambda$ is larger than 1. Details of the combustion control in the first mode are as described in (a-1) of Section (3).

When performing the SPCCI combustion in the first mode, the target $\theta$ci (the target start timing of the CI combustion) is set to have the noise index value (the average value of the in-cylinder pressure levels in the 1 to 4 kHz bands) below the allowable limit W as described in Section (5), and the ignition timing is adjusted to achieve this target $\theta$ci. Therefore, when performing the SPCCI combustion in the first mode, it can be considered that the noise index value basically does not exceed the allowable limit W. However, for example, immediately after the operation point shifts to the first range A1 from a different operating range (one of the second to fifth ranges A2 to A5), or immediately after the combustion mode is switched from the second mode to the first mode within the first range A1, it can be considered that the adjustment of the control amounts cannot catch up and the noise index value temporarily exceeds the allowable limit W. Therefore, in order to grasp the occurrence of such a situation, next at S54, the ECU 100 determines whether the noise index value is above the allowable limit W. Note that the method of specifying the noise index value is similar to S19 of FIG. 9 (S41 to S44 of FIG. 11), and the method of specifying the allowable limit W of the noise index value is similar to S12 of FIG. 9.

If S54 is NO and it is confirmed that the noise index value is below the allowable limit W, the ECU 100 returns the process and continues the SPCCI combustion in the first mode ($\lambda$>1).

If S54 is YES and it is confirmed that the noise index value is above the allowable limit W, the ECU 100 shifts to S55 to switch the combustion mode from the first mode ($\lambda$>1) to the second mode ($\lambda$=1). That is, the combustion mode is switched from the first mode in which the SPCCI combustion is performed in the lean air-fuel ratio environment in which the excess air ratio $\lambda$ is larger than 1, to the second mode in which the SPCCI combustion is performed in the stoichiometric environment in which the excess air ratio $\lambda$ is substantially 1. In switching to the second mode, the air amount (fresh air amount) introduced into the combustion chamber 6 needs to be reduced. Therefore, as a specific control at S55, a control for increasing the EGR ratio (a ratio of the external EGR gas and the internal EGR gas with respect to the entire gas within the combustion chamber 6) is executed by using the EGR valve 53 and the VVTs 13a and 14a, so as to reduce the air amount inside the combustion chamber 6 to the amount corresponding to the stoichiometric air-fuel ratio.

Note that the control at S55 of switching from the first mode to the second mode is caused immediately when the noise index value above the allowable limit W is confirmed. In other words, unlike the control at S65 (described later) of switching from the second mode to the first mode, setting of standby time using a timer is not performed particularly.

Subsequently, the ECU 100 shifts S56 to activate a timer built in the ECU 100. The measurement time by this timer corresponds to the elapsed time after the mode is switched (the first mode→the second mode) at S55.

Figure 18:
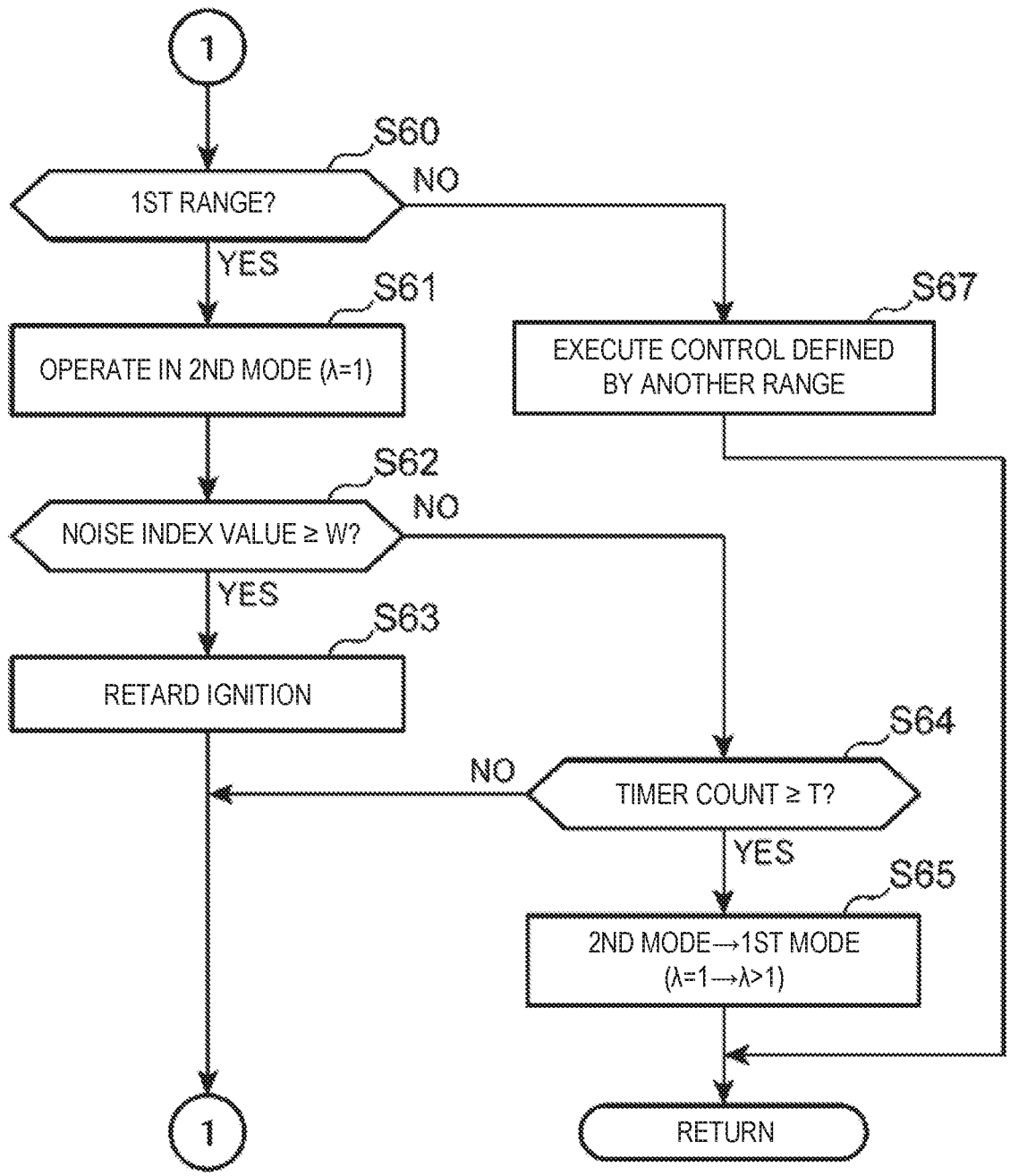
FIG. 18 is a second part of the flowchart illustrating details of the control executed within the first range of the first operation map.

Next, the ECU 100 shifts to S60 of FIG. 18 to determine whether the operation point of the engine remains to be within the first range A1 of the first operation map Q1.

If S60 is NO and it is confirmed that the operation point is outside the first range A1, the ECU 100 shifts to S67 to execute a control defined by the operating range corresponding to the outside the first range A1 (one of the second to fifth ranges A2 to A5).

On the other hand, when S60 is YES and it is confirmed that the operation point is within the first range A1, the ECU 100 shifts to S61 to perform the operation in the second mode in which the SPCCI combustion is performed in the stoichiometric environment in which the excess air ratio λ is substantially 1.

Next, the ECU 100 shifts to S62 to determine whether the noise index value is above the allowable limit W.

Here, since the SPCCI combustion in the second mode (λ=1) is performed in an environment with a large amount of EGR gas, which is inactive gas, the combustion noise is easily reduced compared to the first mode with a small amount of EGR gas. For this reason, it can be expected that S62 basically results in NO (the determination of the noise index value<the allowable limit W).

Note that there is a possibility that relatively loud noise occurs soon after the mode switching to the second mode, and in this case, the result of S62 is YES (noise index value≥allowable limit W). Here, the ECU 100 shifts to S63 to temporarily retard the ignition timing of the spark plug 16.

On the other hand, if S62 is NO and it is confirmed that the noise index value<the allowable limit W as expected, the ECU 100 shifts to S64 to determine whether a count of the timer activated at S56 (i.e., the elapsed time from the mode switching to the second mode) exceeds a given reference period of time T.

If S64 is NO and it is confirmed that the count of the timer is below the reference time period T, the ECU 100 returns the process to S60. Further, if S60 is YES, the SPCCI combustion in the second mode is subsequently performed (S61). The SPCCI combustion in the second mode continues until the count of the timer (the duration of the second mode) reaches the reference time period T.

If S64 is YES and it is confirmed that the count of the timer is above the reference time period T, the ECU 100 shifts to S65 to switch the combustion mode from the second mode (λ=1) to the first mode (λ>1). That is, the combustion mode is switched from the second mode in which the SPCCI combustion is performed in the stoichiometric environment in which the excess air ratio λ is substantially 1, to the first mode in which the SPCCI combustion is performed in the lean air-fuel ratio environment in which the excess air ratio α is larger than 1.

(7) Operations and Effects

As described above, in this embodiment, within the first range A1 of the first operation map used in the warmed-up state of the engine, the SPCCI combustion in the first mode in which the air-fuel ratio (A/F) is larger than the stoichiometric air-fuel ratio and the SPCCI combustion in the second mode in which the air-fuel ratio is substantially the stoichiometric air-fuel ratio and the EGR ratio is larger than that in the first mode are selectively performed. For example, when it is confirmed during the SPCCI combustion in the first mode, that the noise index value specified based on the detection value of the in-cylinder pressure sensor SN3 is above the allowable limit W, the combustion mode is switched from the first mode to the second mode. On the other hand, after the switching from the first mode to the second mode, even if the noise index value is below the allowable limit W, the resumption to the first mode is not caused unless the elapsed time from this switching reaches the given reference time period T. This configuration is advantageous in relieving discomfort of a person(s) in a cabin caused by the mode switch during the SPCCI combustion.

That is, when the combustion mode is switched from the first mode to the second mode, the EGR ratio is increased accordingly so that the ratio of the inactive gas inside the combustion chamber 6 is increased. Thereby, the combustion speed of the mixture gas is reduced (i.e., the pressure increase rate is reduced) and the combustion noise occurring after the switching is made small. Thus, it is considered that the noise index value falls below the allowable limit W (i.e., a condition of resuming to the first mode is satisfied) in many cases; however, if the resumption to the first mode is caused immediately at the time, there is a possibility that the noise index value increases again to be above the allowable limit W. In such a situation, the combustion mode is switched from the first mode to the second mode again, which results in frequently repeating the switching between the first mode and the second mode. Since the air-fuel ratio and the EGR ratio differ between the first mode and the second mode, it is considered that the waveform of the heat generation (pressure increase) at the combustion is different and the sound of the occurred noise is also different. Thus, if the switching between the first/second modes is repeated frequently, such a change in noise (sound) occurs frequently, which may cause the person(s) in a cabin to feel discomfort. In this regard, as described in the above embodiment, when the resumption to the first mode is not caused unless the given time period T elapses from the switching to the second mode, the switching between the first/second modes are not repeated frequently. As a result, the change in noise (sound) accompanying the switching of the mode is efficiently avoided from occurring frequently so as to reduce the discomfort of the person(s) in a cabin.

On the other hand, in the above embodiment, when the noise index value above the allowable limit W is confirmed during the SPCCI combustion in the first mode (i.e., a condition of switching from the first mode to the second mode is satisfied), the switching to the second mode is caused immediately at the time. Thus, the first mode in which the noise becomes relatively large is not continued unnecessarily and the combustion noise is effectively reduced by the prompt switch to the second mode.

Further, in this embodiment, as the combustion mode is switched from the first mode to the second mode, the ratio of the exhaust gas (the EGR gas) inside the combustion chamber 6 increases accordingly while the ratio of air (fresh air) reduces. Therefore, the total gas amount inside the combustion chamber 6 does not differ greatly between the first/second modes, and a large change in torque due to a difference in pumping loss, etc. (a difference in output torque before and after switching) is effectively avoided at the time of switch between the first/second modes.

Further, in this embodiment, when the noise index value above the allowable limit W is confirmed during the operation in the first range A1 in the warmed-up state (the first operation map Q1), the combustion mode is switched from the first mode to the second mode so as to increase the EGR ratio. In other words, it means that the SPCCI combustion in the first mode with the low EGR ratio is continued unless the noise index value above the allowable value W is confirmed. Thus, the period in which the SPCCI combustion is performed in the environment with a large heat capacity ratio of the mixture gas is performed is secured long, and the fuel efficiency of the engine is effectively improved.

That is, when the effective compression ratio is ε and the heat capacity ratio of the mixture gas is κ, a theoretical thermal efficiency η of an Otto cycle engine is expressed by the following Equation 1.

$$\eta = 1 - (1/\varepsilon^{\kappa-1}) \ldots \quad (1)$$

Therefore, it can be considered that when the effective compression ratio $\varepsilon$ is constant, as the heat capacity ratio $\kappa$ of the mixture gas is larger, the theoretical thermal efficiency $\eta$ becomes higher and the fuel efficiency improves more.

The heat capacity ratio $\kappa$ decreases as the number of atoms constituting a gas molecule increases. For example, a triatomic molecule such as $CO_2$ and $H_2O$, which is contained within EGR gas by a large amount, has a lower heat capacity ratio $\varepsilon$ than a diatomic molecule such as $N_2$ and $O_2$, which is mainly contained within air (fresh air). For this reason, when the second mode with a high EGR ratio is selected, the large amount of triatomic molecule within the EGR gas is contained within the mixture gas, and the heat capacity ratio $\kappa$ of the mixture gas decreases. This means that the theoretical thermal efficiency $\eta$ decreases and the fuel efficiency degrades. On the other hand, in this embodiment, the first mode with the low EGR ratio is preferentially selected during the operation within the first range A1, and the operation mode does not switch to the second mode unless the combustion noise increases. Therefore, the period in which the SPCCI combustion in the first mode with the low EGR ratio (thus the high heat capacity ratio) is performed is ensured as long as possible and the fuel efficiency is effectively increased.

In this embodiment, the target combustion center of gravity (and the target SI ratio) when performing the SPCCI combustion is determined in advance for each engine speed and each engine load, and the target values of the control amounts, such as the ignition timing by the spark plug 16, the injection amount/timing of the fuel, and the in-cylinder state functions (the temperature, the EGR ratio, etc.), are determined in advance so that the target combustion center of gravity (and the target SI ratio) is obtained. Further, when the engine is operating within the first range A1 in the warmed-up state, the target values of the control amounts are determined so that when either of the first mode and the second mode is selected, the target combustion center of gravity is located at the same position as long as the engine speed and load are the same. According to such a configuration, since the combustion center of gravity does not largely deviate even when the combustion mode is switched between the first mode and the second mode, a change in torque when switching the mode (a difference in output torque before and after switching) is reduced, and a smooth mode switching which is not easily perceived by a passenger is achieved.

Further, in this embodiment, when the SPCCI combustion in the first/second mode is performed within the first range A1, since the ignition timing by the spark plug 16 is adjusted so that the noise index value is made below the allowable limit W (i.e., the ignition timing is corrected with respect to the target value as necessary), basically (especially during a steady operation), the noise of SPCCI combustion within the first range A1 is maintained at a sufficiently low level. However, even in this case, for example, immediately after shifting from the second mode with the high EGR ratio to the first mode with the low EGR ratio, the adjustment of the control amount cannot catch up and there is a possibility that loud noise may temporarily occur. In this embodiment, since the combustion mode is returned to the second mode and the EGR ratio is reduced in such a case, it is effectively avoided that loud noise caused by the mode switching continuously occurs.

(8) Modifications

Although in this embodiment, after the switching from the first mode to the second mode is performed in the first range A1 (FIG. 5A) in the warmed-up state, even if the condition of resuming to the first mode (the condition of the noise index value being below the allowable limit W) is satisfied, the resumption to the first mode is not caused unless the elapsed time from this switching reaches the given time period T and the second mode is continued instead, it is not necessary to continue the second mode until the given time period T elapses. For example, until the given time period T is elapsed after the resumption condition to the first mode is satisfied, the SPCCI combustion may be performed in an intermediate state between the first mode and the second mode and, when the given time period T elapses, the combustion is switched to the SPCCI combustion in the first mode.

Further, although in this embodiment, if the condition of switching to the second mode (the condition of the noise index value being above the allowable limit W) is satisfied during the SPCCI combustion in the first mode in the first range A1, the switching to the second mode is caused immediately at the time, the switching to the second mode may be caused after the elapsed time after the start of the first mode exceeds a certain period of time (note that this time period is shorter than the given time period T).

Although in this embodiment, the noise index value is specified based on the in-cylinder pressure detected by the in-cylinder pressure sensor SN3 (detector), the parameter which needs to be detected in order to specify the noise index value may be any parameter as long as it relates to noise accompanying combustion, and the in-cylinder pressure is merely one example. For example, vibration (vibration acceleration) of the engine body 1 or noise itself which the engine body 1 produces may be detected as the parameter. That is, the detector of the present disclosure may use, other than the in-cylinder pressure, a vibration sensor configured to detect the vibration of the engine body 1, a noise sensor configured to detect noise, etc.

In this embodiment, based on the in-cylinder pressure detected by the in-cylinder pressure sensor SN3, the average value of the in-cylinder pressure levels highly correlated with the CI knock, more specifically, the in-cylinder pressure levels of the bands of 1 kHz, 1.25 kHz, 1.6 kHz, 2 kHz, 2.5 kHz, 3.15 kHz, and 4 kHz, which are obtained by Fourier-analyzing the detected waveform of the in-cylinder pressure, is calculated and this average value is used as the noise index value; however, a highest value of the in-cylinder pressure levels in these bands may alternatively be calculated as the noise index value. Further, since the CI knock is a resonance phenomenon with the engine components, and resonance frequencies are naturally limited to a few frequencies, the noise index value may be calculated using only the in-cylinder pressure levels in a limited band closest to each resonance frequency. In other words, the in-cylinder pressure levels in a part of each band far from the resonance frequency may be disregarded.

In addition, the noise index value is not limited to the value obtained based on the in-cylinder pressure levels of the 1 to 4 kHz bands as described above. For example, a first noise index value may be calculated based on the in-cylinder pressure levels of the 1 to 4 kHz bands (i.e., highly correlated with the CI knock), a second noise index value may be calculated based on the in-cylinder pressure of the 6.3 kHz band, which is highly correlated with the SI knock, is calculated, and the SPCCI combustion may be controlled based on both of the first and second noise index values. Alternatively, a higher one of the first and second noise index values may be used.

Although in this embodiment, the target $\theta ci$ (the target value of the start timing $\theta ci$ of the CI combustion) with which the noise index value does not exceed the allowable limit W is set and the ignition timing by the spark plug 16 (the spark-ignition timing) is adjusted to achieve the target θci, alternatively/additionally to the ignition timing, the fuel injection timing from the injector 15 may be adjusted. Furthermore, both the fuel injection timing and the fuel injection amount may be adjusted.

In this embodiment, within the first range A1 of the first operation map Q1 used in the warmed-up state of the engine, one of the first mode and the second mode with different air-fuel ratio (A/F) and different EGR ratio are selectable, when switching between the first mode and the second mode, the amount of the EGR gas (the external EGR gas and the internal EGR gas) is changed while the throttle valve 32 is fully opened, so that the air-fuel ratio and the EGR ratio are changed. However, in addition to (or instead of) such a control, the air-fuel ratio and the EGR ratio may be changed by opening/closing the throttle valve 32. The throttle valve 32 opened/closed for such a purpose corresponds to "EGR controller" and "air-fuel ratio controller." Note that when controlling the air-fuel ratio and the EGR ratio using the throttle valve 32, in the second mode in which the air-fuel ratio (A/F) is relatively low, the throttle valve 32 may be driven to have a narrower opening than in the first mode. In this case, the gas-fuel ratio (G/F) is lower in the second mode than in the first mode.

Although in this embodiment, the booster 33 mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a and 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

In this embodiment, the swirl valve 18 is provided to one of the two intake ports 9A and 9B (the second intake port 9B) provided to one cylinder 2, and the opening of the swirl valve 18 is changed to adjust the strength of the swirl flow. However, the method of adjusting the strength of the swirl flow is not limited to this. For example, the strength of the swirl flow may be adjusted by setting the lift amount of the intake valve 11 which opens and closes the first intake port 9A and the lift amount of the intake valve 11 which opens and closes the second intake port 9B different from each other or the operating timings of these two intake valves 11 different from each other.

Although in this embodiment, the target values of the control amounts, such as the ignition timing, are determined in advance to achieve the target combustion center of gravity and the target SI ratio determined for each operating condition, and the ignition timing is corrected as needed so that an estimated noise index value is below the allowable limit W. Additionally (or alternatively), a feedback control based on the combustion center of gravity or the SI ratio may be executed.

For example, when executing the feedback control based on the combustion center of gravity, the combustion center of gravity is calculated for each combustion (SPCCI combustion) based on the detected waveform of the in-cylinder pressure sensor SN3, etc., and when the calculated combustion center of gravity deviates from the target combustion center of gravity, the ignition timing, the injection amount/timing, etc. are corrected to reduce the deviation.

Similarly, when performing the feedback control based on the SI ratio, the SI ratio in each combustion is calculated based on the detected waveform of the in-cylinder pressure sensor SN3, etc., and when the calculated SI ratio deviates from the target SI ratio, the ignition timing, the fuel injection amount/timing, etc. are corrected to reduce the deviation.

Note that when calculating the SI ratio of each combustion as described above, various specific methods can be considered to calculate this SI ratio.

For example, the heat generation rate at each crank angle timing may be calculated from the detected waveform by the in-cylinder pressure sensor SN3, and the areas R1 and R2 illustrated in FIG. 8 may be calculated based on the data (waveform) of the calculated heat generation rate. In this case, although the SI ratio may be calculated as SI ratio=R1/(R1+R2) as described above, alternatively, SI ratio=R1/R2 may be established.

Figure 19:
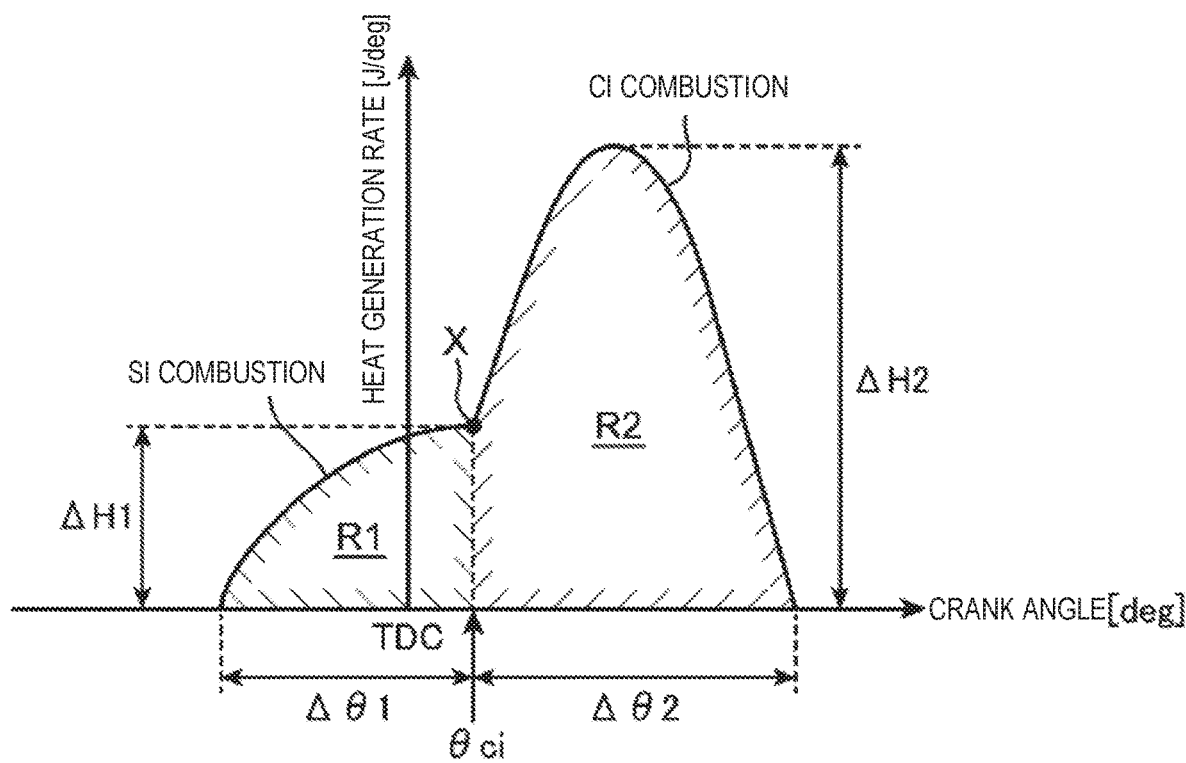
FIG. 19 is a chart corresponding to FIG. 8, illustrating various defining methods of an SI ratio.

Further, the SI ratio may be calculated using $\Delta\theta 1$ and $\Delta\theta 2$ illustrated in FIG. 19. That is, when the crank angle period of the SI combustion (the crank angle period on the advancing side of the flection point X) is $\Delta\theta 1$ and the crank angle period of the CI combustion (the crank angle period on the retarding side of the flection point X) is $\Delta\theta 2$, SI ratio=$\Delta\theta 1$/($\Delta\theta 1+\Delta\theta 2$) or SI ratio=$\Delta\theta 1/\Delta\theta 2$ may be established.

Furthermore, when a peak of the heat generation rate of the SI combustion is $\Delta H1$ and a peak of the heat generation rate of the CI combustion is $\Delta H2$, SI ratio=$\Delta H1$/($\Delta H1+\Delta H2$) or SI ratio=$\Delta H1/\Delta H2$ may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
13a Intake VVT (EGR Controller, air-fuel ratio controller)
14a Exhaust VVT (EGR Controller, air-fuel ratio controller)
15 Injector
16 Spark Plug
53 EGR Valve (EGR Controller, air-fuel ratio controller)
100 ECU (Combustion controller)
SN3 In-cylinder Pressure Sensor (Detector)

What is claimed is:

1. A control device for a compression-ignition engine in which partial compression-ignition combustion including spark ignition (SI) combustion performed by combusting a portion of a mixture gas inside a cylinder by spark ignition followed by compression ignition (CI) combustion performed by causing the remaining mixture gas inside the cylinder to self-ignite is executed at least within a part of an operating range of the engine, comprising:
- an EGR (exhaust gas recirculation) controller configured to change an EGR ratio that is a ratio of exhaust gas recirculated into the cylinder; and
- a combustion controller configured to control the EGR controller during the partial compression-ignition combustion to switch a combustion mode between a first mode and a second mode in which the EGR ratio is higher than the first mode,
- wherein after the combustion mode is switched from the first mode to the second mode, the combustion controller is configured to cause the resumption to the first mode upon first determining that both of the following are satisfied:
- a noise index value has fallen below an allowable limit, and
- a given period of time has elapsed from the switching to the second mode.

2. The device of claim 1, wherein when the second mode is selected, the combustion controller controls an air-fuel ratio that is a ratio of air to fuel inside the cylinder to be more reduced than when the first mode is selected.

3. The device of claim 1, wherein after the partial compression-ignition combustion in the first mode is started and if the noise index value has fallen below the allowable limit, the combustion controller causes the switching to the second mode, immediately after the noise index value has fallen below the allowable limit or after a shorter period of time has elapsed from the start of the first mode than the given period.

4. The device of claim 1, wherein a target value of a given control amount including a timing of the spark ignition is determined in advance so that a combustion center of gravity of the partial compression-ignition combustion in the first mode and a combustion center of gravity of the partial compression-ignition combustion in the second mode are located at the same position when an engine speed and an engine load are the same in the first mode and the second mode.

5. The device of claim 4, wherein, during the partial compression-ignition combustion in the first and second modes, the combustion controller corrects the control amount with respect to the target value based on the noise index value representing noise accompanying the combustion, and when the noise index value is confirmed to exceed a given threshold while the first mode is selected, switches the combustion mode from the first mode to the second mode.

6. A control device for a compression-ignition engine in which partial compression-ignition combustion including spark ignition (SI) combustion performed by combusting a portion of a mixture gas inside a cylinder followed by compression ignition (CI) combustion performed by causing the remaining mixture gas inside the cylinder to self-ignite is executed at least within a part of an operating range of the engine, comprising:
- an air-fuel ratio controller configured to change an air-fuel ratio that is a ratio of air to fuel inside the cylinder; and
- a combustion controller configured to control the air-fuel ratio controller during the partial compression-ignition combustion to switch a combustion mode between a first mode and a second mode in which the air-fuel ratio is lower than the first mode,
- wherein after the combustion mode is switched from the first mode to the second mode, the combustion controller is configured to cause the resumption to the first mode upon first determining that both of the following are satisfied:
- a noise index value has fallen below an allowable limit, and
- a given period of time has elapsed from the switching to the second mode.

* * * * *